(12) United States Patent
Tsubouchi et al.

(10) Patent No.: US 7,233,585 B2
(45) Date of Patent: Jun. 19, 2007

(54) WIRELESS COMMUNICATION METHOD

(75) Inventors: Kazuo Tsubouchi, Miyagi (JP); Hiroyuki Nakase, Miyagi (JP); Suguru Kameda, Miyagi (JP)

(73) Assignee: Clarion Co., Ltd., Tokyo (JP)

( * ) Notice: Subject to any disclaimer, the term of this patent is extended or adjusted under 35 U.S.C. 154(b) by 977 days.

(21) Appl. No.: 09/974,679

(22) Filed: Oct. 11, 2001

(65) Prior Publication Data
US 2002/0159413 A1 Oct. 31, 2002

(30) Foreign Application Priority Data
Feb. 26, 2001 (JP) ............... 2001-050751

(51) Int. Cl.
*H04B 7/216* (2006.01)
(52) U.S. Cl. ..................... 370/342; 375/149
(58) Field of Classification Search ............... 370/342; 375/149
See application file for complete search history.

(56) References Cited

U.S. PATENT DOCUMENTS

| | | | | |
|---|---|---|---|---|
| 5,488,629 A * | 1/1996 | Takahashi et al. | .......... | 375/150 |
| 5,734,643 A * | 3/1998 | Rondeau | .......... | 370/279 |
| 5,761,239 A * | 6/1998 | Gold et al. | .......... | 375/150 |
| 5,898,665 A * | 4/1999 | Sawahashi et al. | .......... | 370/342 |
| 6,421,367 B1 * | 7/2002 | Kuroyanagi et al. | .......... | 375/130 |
| 6,728,305 B2 * | 4/2004 | Ogawa et al. | .......... | 375/148 |
| 6,731,622 B1 * | 5/2004 | Frank et al. | .......... | 370/342 |
| 2001/0028637 A1 * | 10/2001 | Abeta et al. | .......... | 370/208 |
| 2003/0156603 A1 * | 8/2003 | Rakib et al. | .......... | 370/485 |

FOREIGN PATENT DOCUMENTS

JP 410285136 A * 10/1998

* cited by examiner

*Primary Examiner*—Doris H. To
*Assistant Examiner*—Phuongchau Ba Nguyen
(74) *Attorney, Agent, or Firm*—Morgan, Lewis & Bockius, LLP

(57) ABSTRACT

A cellular wireless communication network system having a plurality of base stations (1) and a plurality of mobile stations (#i) (i is an integer from 1 to N) is provided in which communication with wireless circuit is established between the respective base stations (1), and a flexibility of arrangement for the base station location is improved to realize a construction of the communication network with inexpensive cost.

6 Claims, 21 Drawing Sheets

WIRELESS COMMUNICATION METHOD

BACKGROUND OF THE INVENTION

1. Field of the Invention

The present invention relates to a cellular wireless communication network system consisted of a plurality of base stations and a plurality of mobile stations.

2. Description of the Prior Art

For these years as a novel data communication method which is provided by a progress of the communication technology, a communication method by the spread spectrum method has been studied and is being made practical. In this communication method by the spread spectrum, the data such as an audio signal are modulated into the data signal by means of the spread spectrum method at a communication terminal of the personal handy phone in the transmitting side, and the modulated data signal are transmitted as the wireless signal from an antenna. The modulated data signal are demodulated at a communication terminal in the receiving side to achieve the telecommunication such as the telephone calls in the communication system.

In the meantime the information oriented society in near future is thought to be composed of the information sources such as the databases, the users who utilize the information and the communication circuit through which the information is transferred. The communication network circuit in near future is also thought to be composed of the wired network by the transferring path with large capacity and the wireless network by the personal handy terminal apparatus through which the users can transmit and receive information such as of audio, of video and of data each other at anytime, at anyplace and with anyone. This plan is gradually being realized.

In the wired network, the optical fibers, coaxial cables and so on are utilized. There is a remarkable development and popularization in the wired network as the computer networks which are actually represented by the ISDN and Internet. The feature of this wired network is the high credibility and the capability of a large capacity transmission.

However, the construction of this wired network inevitably requires the installation of cables. In the consequence, a space for cable installation also needs to be prepared. Further there is another problem to construction of the wired network that it requires much cost.

In the wireless communication network system for mobile stations, for example, for personal handy phone or PHS, the base stations must be set up in every some kilometers in an average. And every base station must be connected with the wired network with each other. In the system, a constitution is taken that the mobile stations and the respective base stations are communicating with each other by means of the wireless communication as far as the radio wave from the base station is possible to reach.

For this constitution, there is also a problem that it needs an establishment of cabling in addition to the preparation of space for the base stations, and it causes more cost.

The present invention is made in the light of the above stated problems, and it has an object to provide a cellular wireless communication network system in which an communication with the wireless circuit is established between the respective base stations, and a flexibility of arrangement for the base station location is improved to realize a construction of the communication network with inexpensive cost.

SUMMARY OF THE INVENTION

To achieve the above described object, in accordance with a first aspect of the present invention, a cellular wireless communication network system comprising a plurality of base stations and a plurality of mobile stations, wherein the base stations are connected together with the wireless communication, is provided.

In accordance with a second aspect of the present invention, a wireless communication network system according to the first aspect of the invention, wherein the wireless communication with which the base stations are connected together, is achieved by an OFDM communication method, is provided.

In accordance with a third aspect of the present invention, a wireless communication network system according to the first aspect of the invention, wherein the wireless communication with which the base stations are connected together, is achieved by an AS-CDMA communication method, is provided.

In accordance with a forth aspect of the present invention, a wireless communication network system according to the first aspect of the invention, wherein communication between one of the base stations and the mobile stations is achieved by the packet CDMA communication method, is provided.

In accordance with a fifth aspect of the present invention, a wireless communication network system according to the second or third aspect of the invention, wherein one frame of a packet of the communication method achieved by the packet CDMA communication method, is composed of a preamble block including the barker code and an information block including M series codes which are orthogonal each other, is provided.

In accordance with a sixth aspect of the present invention, a wireless communication network system according to any one of the first to the fifth aspects of the invention, wherein the communication between the base station and the mobile stations, is achieved by a multicode transmission method for both of a downlink and an uplink, is provided.

In accordance with a seventh aspect of the present invention, a wireless communication network system according to the sixth aspect of the invention, wherein the multicode transmission method is achieved by that: the data are assigned to a plurality of different orthogonal spread code; the data assigned to the respective orthogonal code are combined together at the same time to compose one information block; and the information block is added after the preamble block to compose the one frame when the information is transmitted, is provided.

In accordance with an eighth aspect of the present invention, a wireless communication network system according to the seventh aspect of the invention, wherein the multicode transmission method is achieved by that: the information block is detected by a detection of the preamble; the spread code are reversely spread after a synchronization of the respective spread code has established which are included in the information block; and the whole information is demodulated by demodulation of the data based on the respective spread code and synthesizing the respective data when the information is received, is provided.

According to the first to the eighth aspects of the invention, because the communication circuit without wire can be established between the base stations, the flexibility of arrangement for base station location is improved, and it causes to realize a construction of communication network with inexpensive cost.

In accordance with a ninth aspect of the present invention, a wireless communication network system according to any one of the first to fifth aspects of the present invention, wherein the communication between the base station and the mobile stations, is achieved by a M-array transmission method for both of a downlink and an uplink, is provided.

In accordance with a tenth aspect of the present invention, a wireless communication network system according to the ninth aspect of the invention, wherein the M-array transmission method is achieved by that: the data are divided and the orthogonal spread code are assigned to the every data respectively; the spread code are selected in order of time base and combined together to compose one information block; and the information block is added after the preamble block to compose the one frame of the data when the information is transmitted, is provided.

In accordance with an eleventh aspect of the present invention, a wireless communication network system according to the tenth aspect of the invention, wherein the M-array transmission method is achieved by that: the information block is detected by a detection of the preamble; after the synchronization of the respective orthogonal spread code which are included in the information block, has established, a number of reverse spread code are generated, the number of which corresponds to the number of orthogonal spread code used based on the synchronizing signal; after the respective orthogonal spread code which are included in the information block are reversely spread, the data are demodulated through the integral networks by comparing the resulted integrated value made by the respective integral networks when the information is received, is provided.

According to the tenth and eleventh aspects of the invention, a transmission speed can be improved.

In accordance with a twelfth aspect of the present invention, a wireless communication network system according to any one of the first to fourth aspects of the invention, wherein the communication between the base station and the mobile stations, is achieved utilizing the approximate synchronized CDMA method at the uplink, and wherein the packet is composed of the one frame which includes a synchronizing block and an information block which are arranged in this order, and the information block is the approximate synchronized CDMA code, is provided.

According to the twelfth aspect of the invention, because the approximate synchronized CDMA can be composed of the matched filter with short coded and the sliding correlater, it is possible to realize lower energy consumption.

In accordance with a thirteenth aspect of the present invention, a wireless communication network system according to the twelfth aspect of the invention, wherein the communication between the base station and the mobile stations, is achieved by that an information about the phase is included on the preamble portion, and the cell information about the cell is provided by the information about the phase at the downlink, is provided.

According to the thirteenth aspect of the invention, it is possible to intend an improvement of the efficiency of transmission.

In accordance with a fourteenth aspect of the present invention, a wireless communication network system according to the thirteenth aspect of the invention, wherein the communication between the base station and the mobile stations, is achieved by that an absolute phase is detected by the phase information on the preamble portion as a reference phase, and the data are subjected to the phase correction and the frequency offset correction after reverse spreading, then the data arc demodulated by the absolute synchronizing detection at the downlink, is provided.

According to the fourteenth aspect of the invention, because the efficiency of demodulation is improved, the energy per 1 bit (Eb)/noise power per 1 Hz (NO) which is required for the transmission, can be reduced.

In accordance with a fifteenth aspect of the present invention, a wireless communication network system according to any one of the first to the fourteenth aspects of the invention, wherein said base station takes the correlation of the uplink at the receiving portion and then detects the receiving timing, calculate a timing that said receiving timing becomes the most suitable, inserts the most suitable timing as the timing controlling information into the frame for downlink and send the data, is provided.

In accordance with a sixteenth aspect of the present invention, a wireless communication network system according to the fifteenth aspect Of the invention, wherein the mobile station establishes the synchronization of the spread code by detecting the spread code in the preamble portion at the receiving portion of the downlink, after making the reverse spreading of the spread code, demodulates the data through the integral networks, then extracts the transmission timing control information which is inserted in the received frame, controls the chip timing of the reverse spread code based on the transmission timing controlling information and transmit the data as the uplink, is provided.

According to the fifteenth and sixteenth aspects of the invention, because the transmission timing of uplink can be controlled by that the timing control information for the uplink is inserted into the downlink, the shortening of an interval for the approximate synchronization of the approximate synchronized CDMA can be intended and an improvement of the transmission speed and an increase of the channel number can be expected.

BRIEF DESCRIPTION OF THE DRAWINGS

FIG. 12(*b*) shows another example of the information transmission spread code data which are different from the information transmission spread code data shown in FIG. 12(*a*).

FIG. 17(*b*) is an explanatory diagram of transmission delay time during a communication between the base station and the mobile station and is an explanatory diagram showing a time lag of the first frame of the information transmission spread code which is sent from the mobile station.

FIG. 17(*c*) is an explanatory diagram of the transmission delay time transmission during the communication between the base station and the mobile station, and shows one example of a column of serial data.

FIG. 20(*b*) is an explanatory diagram of a rotation vector with error on frequency and is an explanatory diagram of the phase of rotation vector at the receiver.

DETAILED DESCRIPTION OF THE EMBODIMENT

[Embodiment 1]

Figure 1:
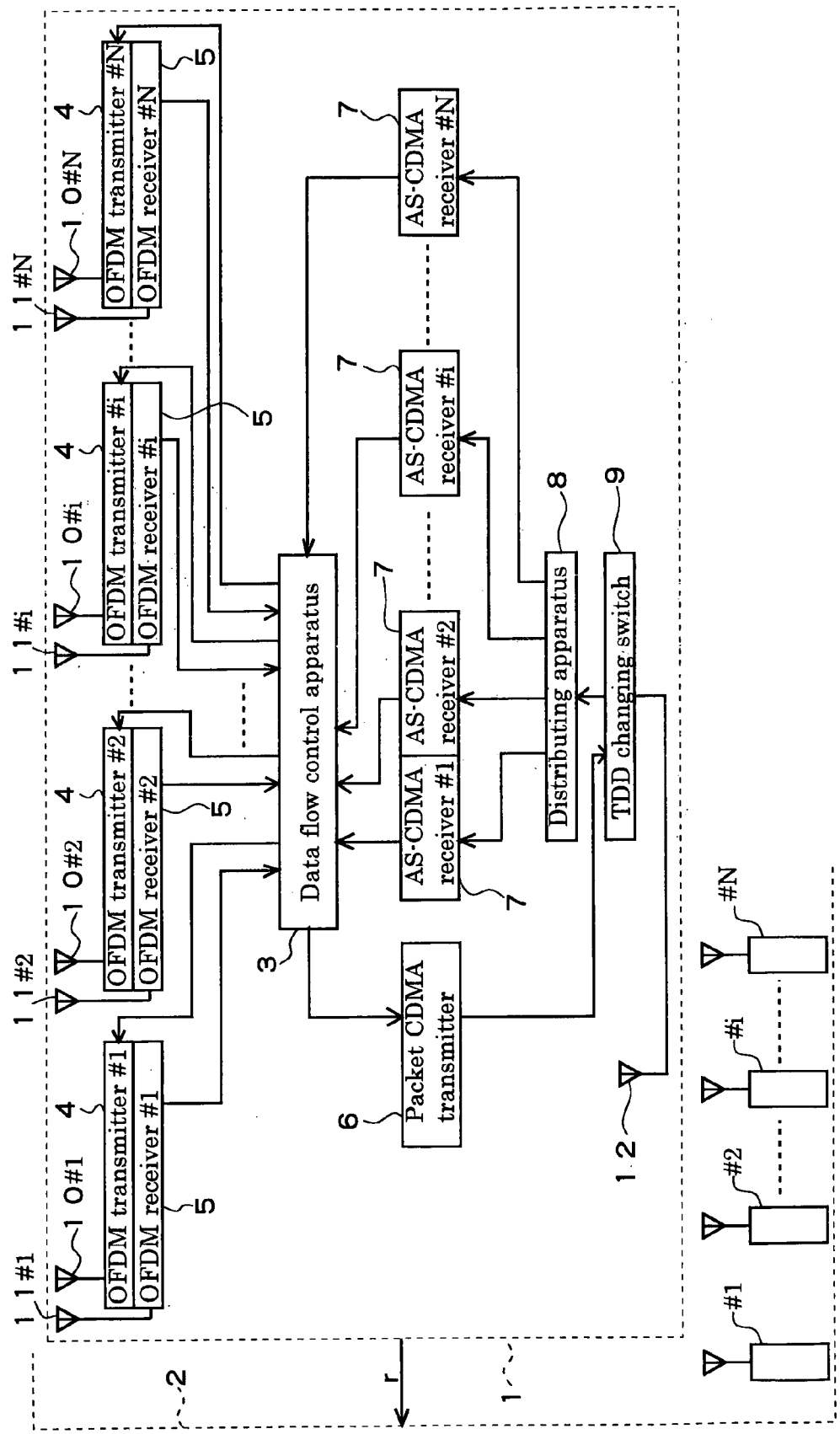
FIG. 1 is a block diagram of the base station in accordance with the embodiment 1 of the present invention.

FIG. 1 shows a block diagram of a base station 1 which utilizes a cellular wireless communication system of the present invention. This base station 1 is supposed to cover the telecommunication with N pieces of mobile stations (personal handy phones, PHSs and telecommunication terminals such as note typed personal computers) #i (i is an integer between 1 to N) which are located within a cell 2 with radius $\chi$.

A communication has been already established between the base station 1 and mobile station #i by a radio wave. The communication is based on, for example, the spread spectrum method.

Each base station 1 includes a data flow controller 3, N pieces of couples of OFDM transmitters $4_{\#i}$ (i is an integer between 1 to N), a OFDM receiver $5_{\#i}$, a packet CDMA transmitter 6, N pieces of AS-CDMA receivers $7_{\#i}$, a distributing apparatus 8 and a TDD changing apparatus 9.

Each OFDM transmitter $4_{\#i}$ has a transmission antenna $10_{\#i}$ for communication with the other cells. Each OFDM receiver $5_{\#i}$, has a receiving antenna $11_{\#i}$ for communication with the other cell. The TDD changing apparatus 9 is connected to a transmitting/receiving antenna 12 for communication within the cell. The data flow controller 3 is connected to each OFDM transmitter $4_{\#i}$, each OFDM receiver $5_{\#i}$, each AS-CDMA receiver $7_{\#i}$ and a packet CDMA transmitter 6. Each AS-CDMA receiver 7#i is connected to the TDD changing apparatus 9 through the distributing apparatus 8. The TDD changing apparatus 9 has the function to change the connection of the transmitting/receiving antenna 12 for communication within the cell between the distributing apparatus 8 and the packet CDMA transmitter 6. By this changing switch, a transmission is changed between an uplink (transmission from the mobile station #i to the base station 1) and an downlink (transmission from the base station 1 to the mobile station #i).

The data flow controller 3 controls the OFDM transmitters $4_{\#i}$, the OFDM receiver $5_{\#i}$, the packet CDMA transmitter 6 and the AS-CDMA receivers $7_{\#i}$. The data flow controller 3 judges if a communication is a transmission from the mobile station which belongs to itself, to a mobile station of other base station, or a receiving from a mobile station of other base station to the mobile station which belongs to itself, or the communication between the mobile stations which belong to itself or a relying communication between the mobile stations of another base station and other base station. The packet CDMA transmitter 6 carries out the function to generate a packet on which it will be described in detail later.

The distributing apparatus 8 has the function to distribute data received at the transmitting/receiving antenna 12 for communication within the cell to each AS-CDMA receiver $7_{\#i}$.

Herein, the term OFDM means the Orthogonal Frequency Division Multiplexing. That is to say, OFDM is a communication method in which the data are modulated to send by OFDM modulation at the transmitter side, and the data are demodulated at the receiver side. In other words, OFDM is a communication method for digital data to be sent are broken up onto large number of sub carriers which are orthogonal each other and each sub carrier is modulated.

Further herein, the term CDMA means the Code Division Multiple Access. That is to say, CDMA is a communication method in which every mobile station #i is assigned a peculiar different code and it causes that each mobile station #i can use the same frequency band at the same time by the spread spectrum technology. Also the term packet used herein means the usual packet which is used in the digital communication technology.

Further herein, the term TDD means the Time Division Duplex. This TDD is one of the bi-directional communication methods between the base station 1 and mobile station #i in the mobile communication system. The TDD is a method in which the same frequency of radio wave is used for the uplink (upward circuit) and the downlink (downward circuit).

Figure 2:
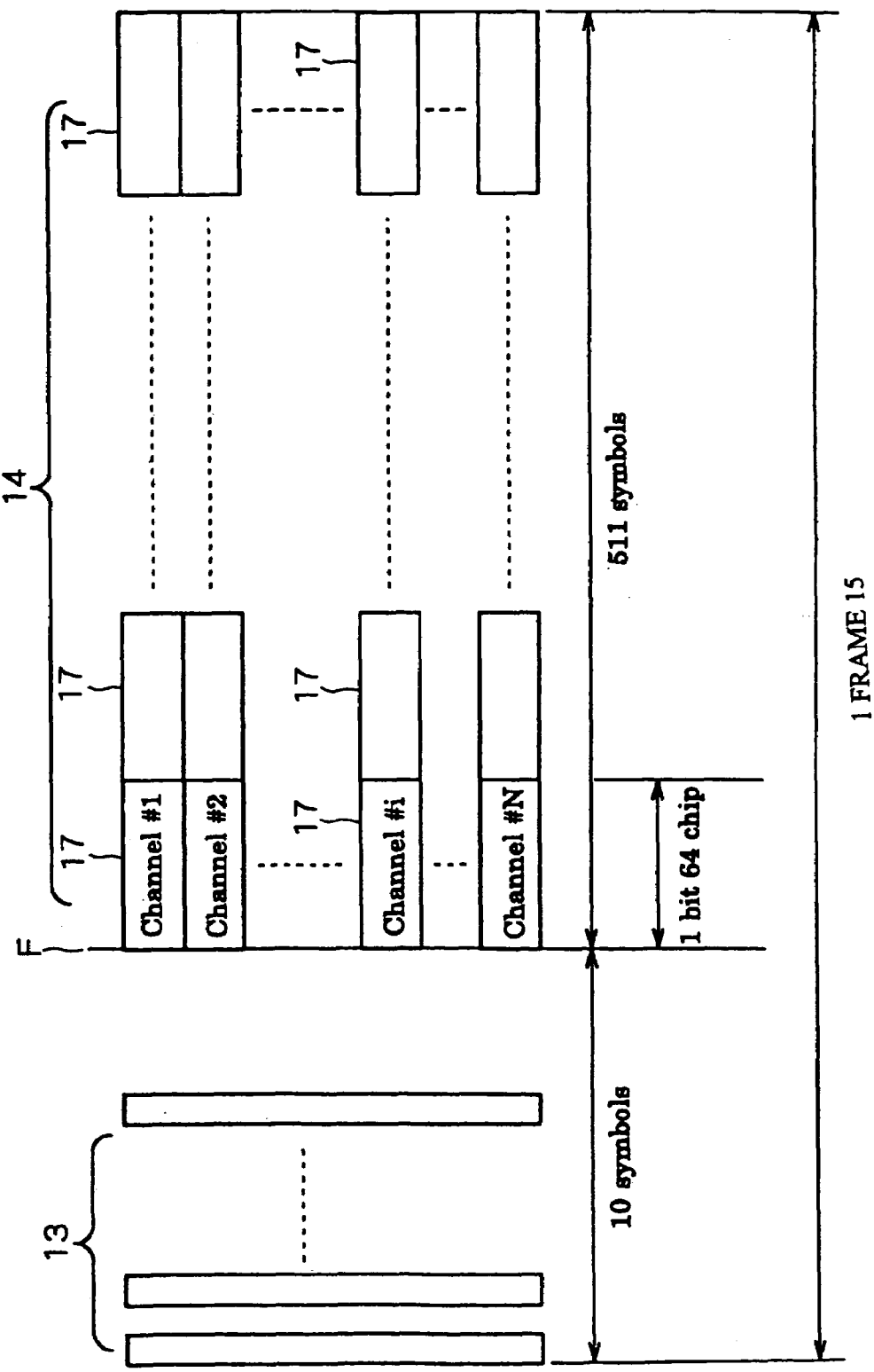
FIG. 2 is a diagram which shows a format of a one frame of the packet CDMA used for a downlink.

A flame 15 of the packet of packet CDMA, as shown in FIG. 2, is made up from a preamble block 13 and an information block 14.

Herein, the preamble block 13 is a code block containing a column of sequential synchronous codes to secure the chip synchronism of orthogonal code at the receiver side. This preamble block 13 is used to establish the synchronism at the mobile station #i side, and a common code is used for all mobile stations #i. The information block 14 is the block in which the information is coded.

In this embodiment, a barker code is used for the preamble block 13. A chip rate of the barker code is, for example, 22 Mcps. The preamble block 13 is made up from, for example, 11 chips. An orthogonal M series code is used in the information block 14. A chip rate of the orthogonal M series code is, for example, 11 Mcps. The N channel of the orthogonal M series code is assigned to each mobile station #i severally.

The frame 15 according to an embodiment of the present invention, is made up from, for example, 10 symbols of the preamble block 13 and, for example, 511 symbols of the information block 14. The information block 14 is made up from N channels. Each information symbol 17 is made up from, for example, 64 chips. By this arrangement, 511 bit of information can be transmitted when the information block 14 has 511 symbols and one symbol one bit transformation is employed.

The packet CDMA transmitter 6 is made capable to send information with arithmetic addition of the information of all channels to all respective mobile stations #i within an area of the base station 1.

Figure 3:
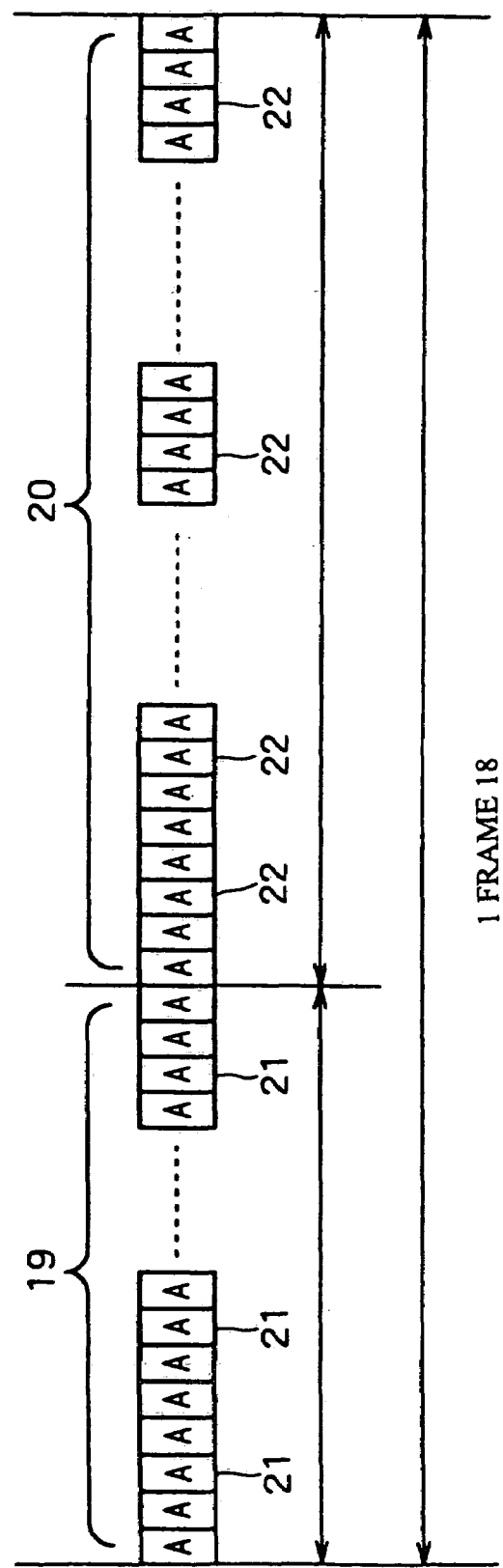
FIG. 3 is a diagram which shows a format of one frame of the approximate synchronized CDMA used for an uplink.

The AS-CDMA means the information transmission spread code. In this approximate synchronized CDMA, a one frame 18 of the approximate synchronized CDMA is made up from, for example, a synchronism block 19 and an information block 20 as shown in FIG. 3. This approximate synchronized CDMA is used for transmission from the mobile station #i to the base station 1.

Respective one symbol 21 and 22 of the synchronism block 19 and the information block 20 are composed of, for example, 4 times repetition of the unit of codes which have 16 chips in respective units. In FIG. 3 these 16 chips are designated with symbol A. Each symbol 21 in the preamble block 19 is sent without any modulation. Each symbol 22 in the information block 20 is sent under the modulation.

In the information transmission spread code, when the data are transformed with the Fourier transform and extracted the components of the frequency, the frequency can be made not to overlap each other though the same codes are used. Also in this information transmission spread code, when a logical multiplication of received codes is taken in the uplink at the base station 1 side, the AS-CDMA receiver 7 can be made so as to avoid the cross talk even during a communication with other mobile station #i within the area of the base station.

According to the embodiment 1 of the present invention, as shown in FIG. 1, the radio wave which is transmitted from the mobile station #i within the area of the base station 1, is received by a transmitting/receiving antenna 12 for communication within the cell 2 which controls the mobile station #i, if, for example, a phone call from a mobile station #i within the area of the base station 1 is made to the other mobile station within the area of other base station.

The TDD changing apparatus 9 judges if the received radio wave is on a transmission or under a receiving. When the received radio wave is on a transmission (uplink) from the mobile station #i within the area of the base station 1, the TDD changing apparatus 9 connects the distributing apparatus 8 to the transmitting/receiving antenna 12 for communication within the cell. The distributing apparatus 8 distributes the information which are received by the transmitting/receiving antenna 12 for communication within the cell, to each AS-CDMA receiver $7_{\#i}$. In this example of the embodiment the information is supposed to come from the i-the mobile station #i, the received information is input from the distributing apparatus 8 to the i-the AS-CDMA receiver #i.

Then the AS-CDMA receiver $7_{\#i}$ demodulates the received information and outputs it to the data flow controller 3. The data flow controller 3 outputs the information to respective OFDM transmitters $4_{\#i}$ for the communication to the mobile stations which are located within the area of other base station.

The respective OFDM transmitters $4_{\#i}$ modulates the information based on the OFDM modulation method, and transmits the information on the radio wave from the transmission antenna $10_{\#i}$ to the mobile station # within the cell of other base station which is the opponent. The receiving antenna 11#i for communication with the other cell of the other base station which is the opponent, receives the information which are modulated by the OFDM modulation method, and outputs to the respective OFDM receivers $5_{\#i}$. The respective OFDM receiver $5_{\#i}$ demodulates the information which are modulated by the OFDM modulation method, and outputs it to the data flow controller 3. If the communication is for the mobile station located within the area of the base station itself, the data flow controller 3 outputs the information to the packet CDMA transmitter 6. If the communication is for the mobile station located within the area of the other base station, the data flow controller 3 achieves a required process to transmit it to the other base station.

The packet CDMA transmitter 6 makes the frame 15 of the packet CDMA based on the information, and outputs it to the TDD changing apparatus 9. The TDD changing apparatus 9 connects the packet CDMA transmitter 6 to the transmitting/receiving antenna 12 for communication within the cell because the information is a transmission from base station to the mobile station (downlink).

In this embodiment a description will be given supposing that the communication is made between the mobile station #1 which is shown in FIG. 1 and a mobile station which is located within the area of the other base station. The other mobile stations #3 to #N also have been used for communication with other stations at the same time.

[First Example of a Structure for the Packet CDMA Transmitter 6]

Figure 4:
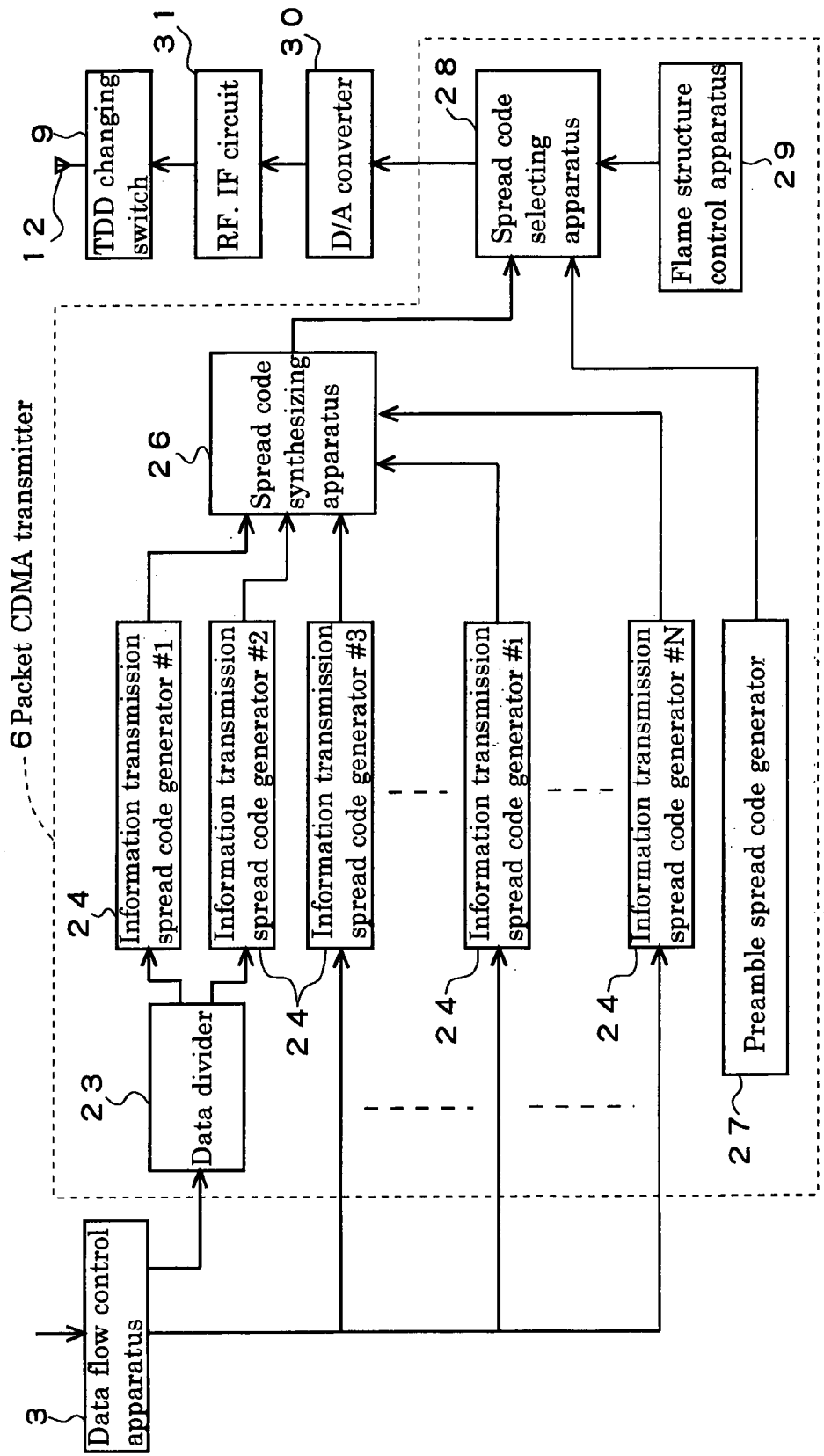
FIG. 4 is a block diagram which shows a first example of structure for the packet CDMA transmitter shown in FIG. 1.

In this embodiment the packet CDMA transmitter 6 is made to have a structure with which a simultaneous transmission of the information can be achieved to the first mobile station #1 by means of two channels #1 and #2 as shown in FIG. 4.

The information sent from the data flow controller 3 has been distributed to a data divider 23 and information transmission spread code generator $24_{\#i}$ (i is an integer from 3 to N) by the data flow controller 3. The data divider 23 has the function to divide the information which has been sent, into two portions to simultaneously transmit them using the two channels #1 and #2.

A front part of the divided information is input to the information transmission spread code generator $24_{\#1}$. A back part of the divided information is input to the information transmission spread code generator $24_{\#2}$. The residual information for the mobile station is input to the corresponding information transmission spread code generator $24_{\#i}$ (i is an integer from 3 to N) respectively.

Each information transmission spread code generator $24_{\#i}$, (i is an integer from 1 to N) assigns, for example, one bit of the information to, for example 64 chips of the orthogonal spread code (M series code) and generates the information transmission spread code data. This information transmission spread code data are input to the spread code generator 26. The information transmission spread code data are designated in $C_{\#i}$ (i is an integer from 1 to N).

The spread code generator 26 makes an information block 14 consisted of 511 symbols with an arithmetic addition of information transmission spread code data from all N channels. The arithmetic addition data is designated in $SUM_j$ (j is an integer from 1 to 511).

Herein, $SUM_j = (C_{\#1} + C_{\#2} + \ldots + C_{\#i} + \ldots + C_{\#N})_j$

The arithmetic addition data $SUM_j$ is input to the spread code selecting apparatus 28 in combination with the output from a preamble spread code generator 27.

The preamble spread code generator 27 generates the preamble block 13 consisted of 10 symbols of the barker code. The spread code selecting apparatus 28 is controlled by a frame structure controller 29. The spread code selecting apparatus 28 combines the data of the preamble block 13 and the data of the information block 14, and composes the frame 15. The data composing the frame 15 is output through the TDD changing apparatus 9 to a D/A converter 30. The D/A converter 30 converts the data from that in digital form to that in analog arm. The D/A converted data are input to the RF. IF circuit 31 as the analog signal.

The RF. IF circuit 31 modulates the analog signal based on the frequency modulation method. The modulated analog signal is transmitted (downlink) from the transmitting/receiving antenna 12 for communication within the cell to the respective mobile stations #i (i=1, 3, ..., N) within the cell 2 of the base station 1.

The information which has the adjusted top end portion F (see FIG. 2) of the information block 14 is received by the respective mobile stations #1, #3, ..., #i, ..., #N located within the cell 2 of the base station 1. This method is called a multi code transmission.

In this embodiment because the channel corresponding to the mobile station #2 is used for transmission of the information of the mobile station #1, the mobile station #2 is arranged to be ignored. In other words, the number of mobile stations that the base station 1 is controlling, is N-1.

[First Example of a Structure for the Receiver of the Mobile Station #1]

Figure 5:
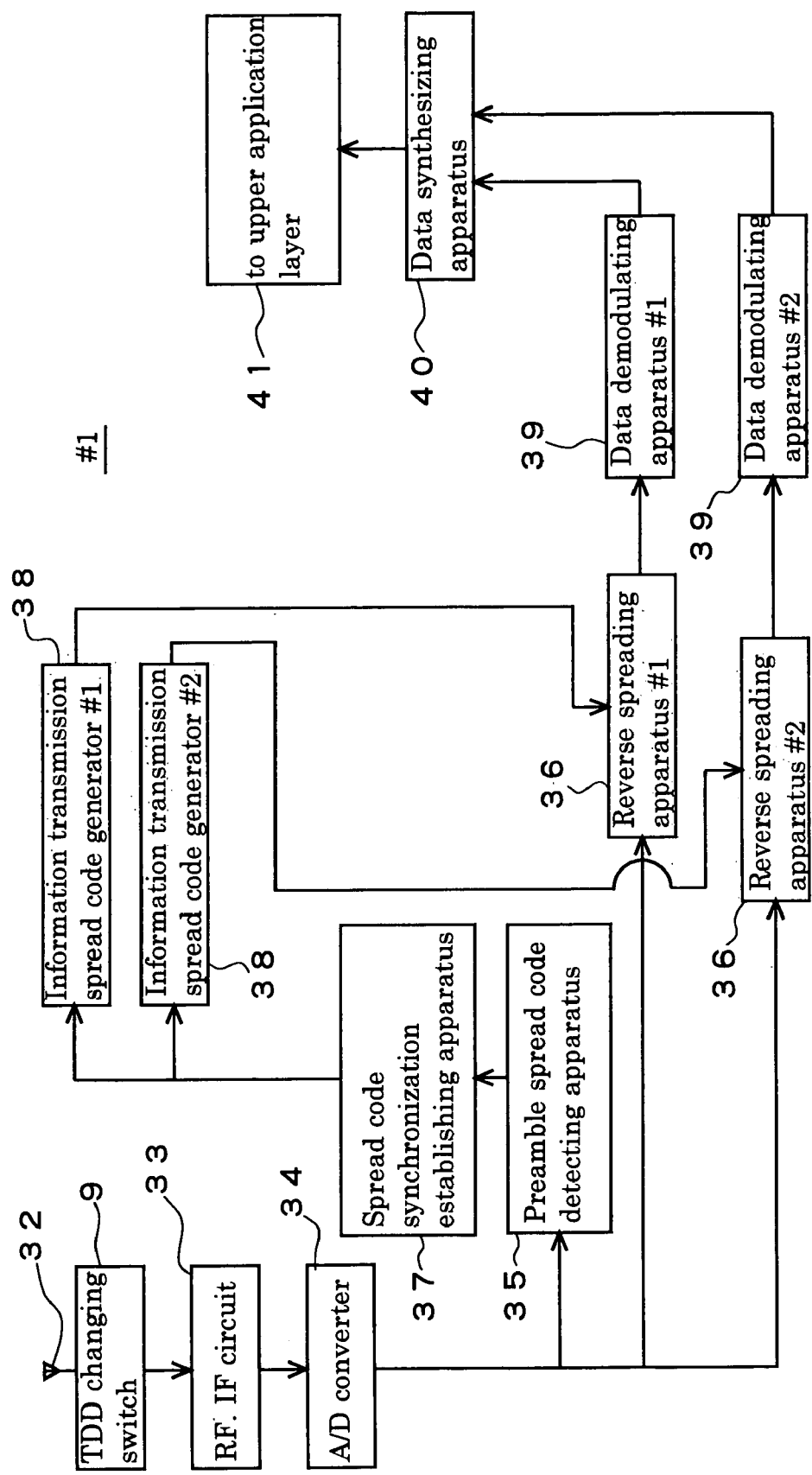
FIG. 5 is a block diagram which shows an example of structure for a receiver of the mobile station corresponding to the packet CDMA transmitter shown in FIG. 4.

FIG. 5 shows an example of structure for a receiver of the mobile station #1 which corresponds to the packet CDMA transmitter 6 shown in FIG. 4.

In this FIG. 5, the sign 32 designates a transmitting/receiving antenna of the mobile station #1. The RF. IF circuit 33 detects the radio wave which comes from the base station 1, and outputs the analog signal to an A/D converter 34. The A/D converter 34 digitally converts the analog signal into the information data.

The information data are input to a preamble spread code detecting apparatus 35 and reverse spreading apparatus $36_{\#1}$ and $36_{\#2}$. The preamble spread code detecting apparatus 35 detects the barker code and outputs the barker code data to the spread code synchronization establishing apparatus 37.

The spread code synchronization establishing apparatus 37 generates a synchronization signal based on the preamble block 13. The synchronization signal is output to information transmission spread code generators $38_{\#1}$ and $38_{\#2}$.

The information transmission spread code generators $38_{\#1}$ and $38_{\#2}$ generate the information transmission spread code data and output the information transmission spread code data to the reverse spreading apparatus $36_{\#1}$ and $36_{\#2}$. The reverse spreading apparatus $36_{\#1}$ and $36_{\#2}$ have the function to calculate the logical multiplication.

In the information transmission spread code, a sign is used that is arranged to produce a square of itself ($C_{\#i} \times C_{\#i}$) when a logical multiplication is made with itself, and that produces zero when a logical multiplication is made with others ($C_{\#i} \times C_{\#k} = 0$ for $i \neq k$).

By this arrangement, when the logical multiplication is taken on $C_{\#1}$ with the arithmetic addition data $SUM_j = (C_{\#1} + C_{\#2} + \ldots + C_{\#i} + \ldots + C_{\#N})_j$, the result $C_{\#1} \times C_{\#1}$ can be gained. And also when the logical multiplication is taken on C#2 with the arithmetic addition data $SUM_j = (C_{\#1} + C_{\#2} + \ldots + C_{\#i} + \ldots + C_{\#N})_j$, the result $C_{\#2} \times C_{\#2}$ can be gained.

Because of this, the reverse spreading apparatus $36_{\#1}$ and $36_{\#2}$ output the logical multiplication data $C_{\#1} \times C_{\#1}$ and $C_{\#2} \times C_{\#2}$, respectively. Because the information symbol 17 of the one frame 15 has j of 511, 511 pieces of the logical multiplications $C_{\#1} \times C_{\#1}$ and $C_{\#2} \times C_{\#2}$ are totally output.

These logical multiplications $C_{\#1} \times C_{\#1}$ and $C_{\#2} \times C_{\#2}$ are input to data demodulating apparatus $39_{\#1}$ and $39_{\#2}$ respectively. The data demodulating apparatus $39_{\#1}$ and $39_{\#2}$ demodulate the data based on the logical multiplications signal $C_{\#1} \times C_{\#1}$ and $C_{\#2} \times C_{\#2}$. The modulated data are input to a data synthesizing apparatus 40. The data synthesizing apparatus 40 synthesizes the two divided data when it is transmitted from the base station 1 into original combined data and sends it to an upper application layer 41. The upper application layer 41 processes the data in appropriate manner based on the contents of the data.

When the packet CDMA transmitter 6 of the base station 1 shown in FIG. 4 and the mobile station #1 shown in FIG. 5 are used in combination, higher speed communication can be realized because two times of data amount for the information can be sent to the mobile station #1 at a time during the downlink from the base station 1 to the mobile station #1. When in the case 1 symbol per 1 bit modulation method is employed, the information consisting of 1022 bit can be sent from the base station 1 to the mobile station #1 at a time.

[Second Example of a Structure for the Packet CDMA Transmitter 6]

Figure 6:
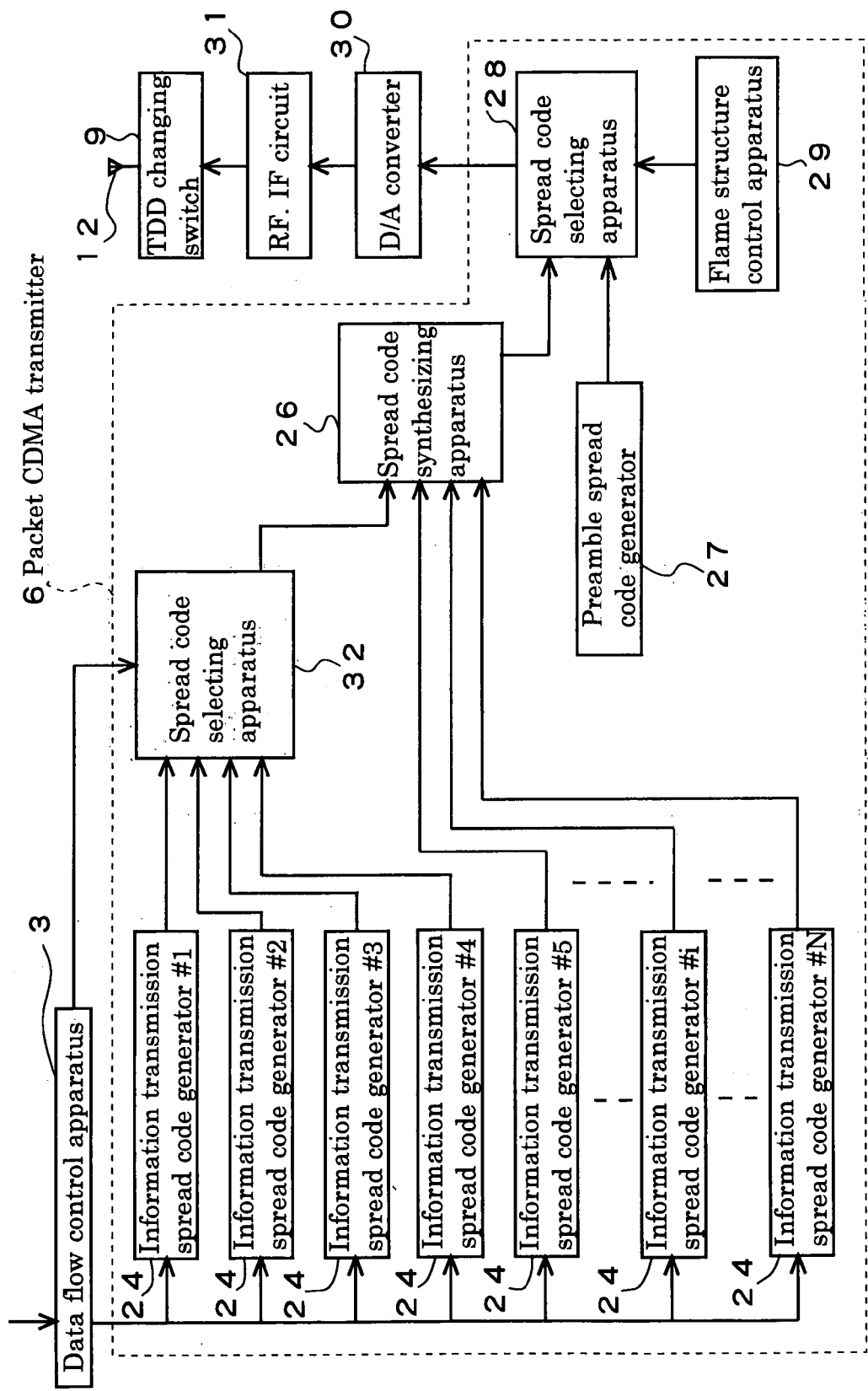
FIG. 6 is a block diagram which shows a second example of structure for the packet CDMA transmitter shown in FIG. 1.

FIG. 6 is a block diagram which shows a second example of structure for the packet CDMA transmitter shown in FIG. 1. In this embodiment an example of the packet CDMA transmitter is disclosed which transmits the information to the mobile station #1 using 4 channels.

The information transmission spread code generator $24_{\#1}$ is made to correspond to the "00" of two bit data, the information transmission spread code generator $24_{\#2}$ is made to correspond to the "01" of two bit data, the information transmission spread code generator $24_{\#3}$ is made to correspond to the "10" of two bit data, and the information transmission spread code generator $24_{\#4}$ is made to correspond to the "11" of two bit data.

These information transmission spread code generator $24_{\#1}$–$24_{\#4}$ generate the information transmission spread code data corresponding to respective two bit data. The information transmission spread code data are input to a spread code selecting apparatus 32. To the spread code selecting apparatus 32, another data is also input from the data flow controller 3. The spread code selecting apparatus 32 decides that which information transmission spread code data (orthogonal spread code) is arranged in order of time corresponding to the data, "+, −", "00", "01", "10" and "11".

The information transmission spread code data which is selected by the spread code selecting apparatus 32, is input to the spread code generator 26. The information transmission spread code generators after the fifth channel $24_{\#5}, \ldots, 24_{\#i}, \ldots, 24_{\#N}$ are assigned to the mobile stations #5–#N.

The information transmission spread code data are also input into the spread code generator 26. The spread code generator 26 outputs an information block 14 consisted of 511 pieces of the arithmetic addition data $SUM_j$. The arithmetic addition data $SUM_j$ are input to the spread code selecting apparatus 28.

The spread code selecting apparatus 28 combines the data of the preamble block 13 and the data of the information block 14 to compose a flame 15 under a control by the frame structure controller 29. The data composing of the frame 15 is output to the D/A converter 30 through the TDD changing apparatus 9. The D/A converter 30 converts the data from that in digital form to that in analog form. The data which are converted from the digital form to the analog form, are input to the RF. IF circuit 31 as the analog signal.

The RF. IF circuit 31 modulates the analog signal based on the frequency modulation method, The frequency modulated analog signal is transmitted (downlink) from the transmitting/receiving antenna 12 for communication within the cell to the respective mobile stations #i (i=1, 5, ... N) within the cell 2 of the base station 1.

The information which has the adjusted top end portion F of the information block 14 is received by the respective mobile stations #1, #5, ..., #i, ..., #N located within the cell 2 of the base station 1. This method is called a M-array transmission.

In this embodiment because four channels are assigned to the mobile station #1, the number of mobile stations that the base station 1 is controlling, is N−4.

Further the information transmission spread code generator $38_{\#1}$–$38_{\#4}$ is corresponded to by 3 bits in case when the BPSK is phase modulation, or 4 bits in case when the QPSK is employed, or much more bits when in the case the multi value modulation is employed. According to the fact, when in the case the information block 14 of the one frame 15 is made up from 511 symbols and the BPSK is employed for the phase modulation, the data consisting of 12×511 bit can be sent for downlink at a time.

[Second Example of a Structure for the Mobile Station #1]

Figure 7:
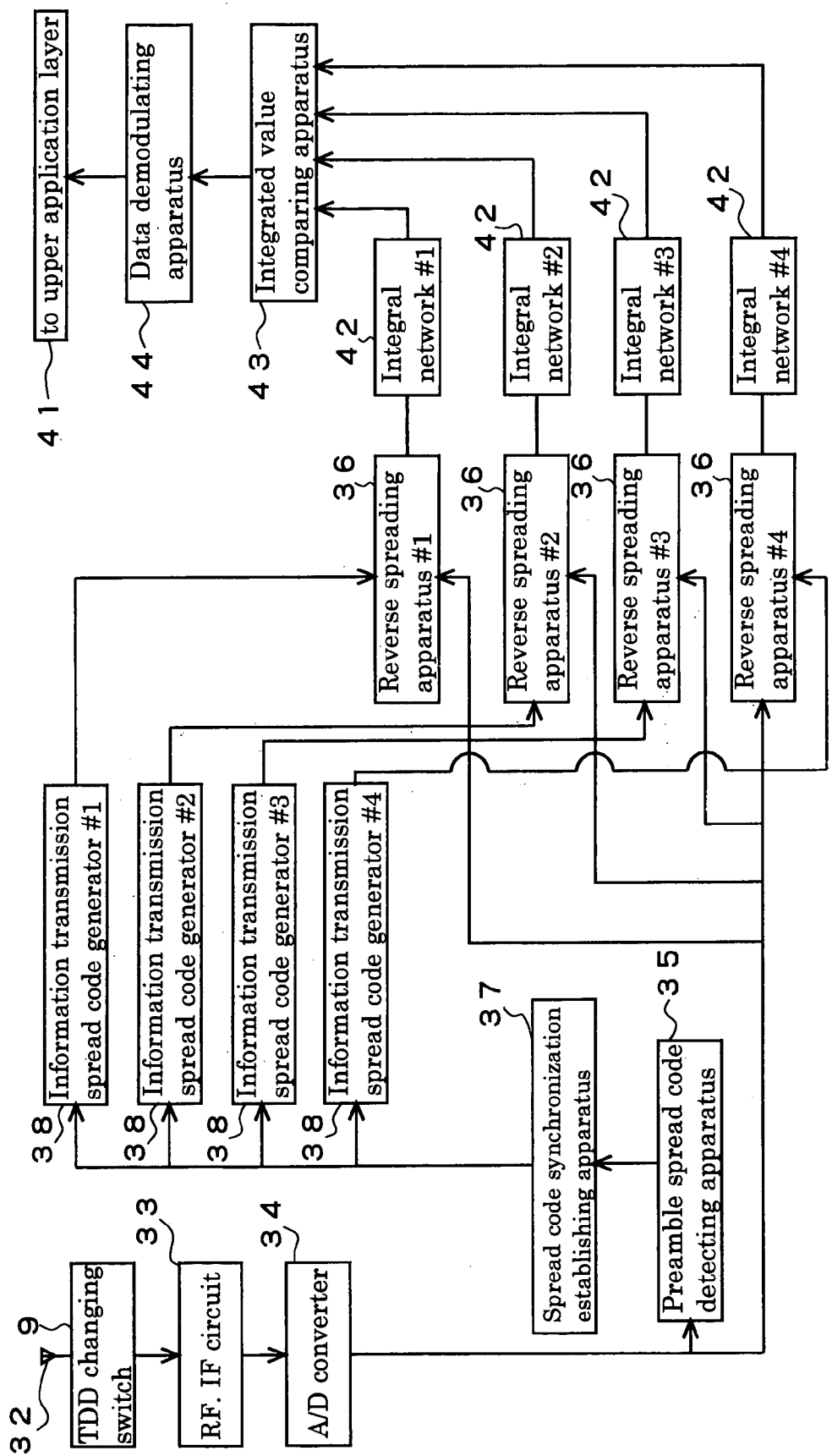
FIG. 7 is a block diagram which shows another example of structure for a receiver of the mobile station corresponding to the packet CDMA transmitter shown in FIG. 6.

FIG. 7 illustrates a structure of the receiver of the mobile station #1 corresponding to the packet CDMA transmitter 6 shown in FIG. 6.

The RF. IF circuit 33 detects the radio wave which comes from the base station 1, and outputs the analog signal to the A/D converter 34. The A/D converter 34 digitally converts the analog signal into the information data.

The information data are input to the preamble spread code detecting apparatus 35 and the reverse spreading apparatus $36_{\#1}, 36_{\#2}, 36_{\#3}$ and $36_{\#4}$. The preamble spread code detecting apparatus 35 detects the barker code and outputs the barker code data to the spread code synchronization establishing apparatus 37.

The spread code synchronization establishing apparatus 37 generates a synchronization signal based on the preamble block 13. The synchronization signal is output to the information transmission spread code generators $38_{\#1}, 38_{\#2}, 38_{\#3}$ and $38_{\#4}$.

The information transmission spread code generators $38_{\#1}, 38_{\#2}, 38_{\#3}$ and $38_{\#4}$ generate the information transmission spread code data and output the information transmission spread code data to the reverse spreading apparatus $36_{\#1}, 36_{\#2}, 36_{\#3}$ and $38_{\#4}$. The reverse spreading apparatus $36_{\#1}, 36_{\#2}, 36_{\#3}$ and $36_{\#4}$ have the function to calculate the logical multiplication.

The reverse spreading apparatus $36_{\#1}, 36_{\#2}, 36_{\#3}$ and $36_{\#4}$ output the logical multiplication data $C_{\#1} \times C_{\#1}$, $C_{\#2} \times C_{\#2}$, $C_{\#3} \times C_{\#3}$ and $C_{\#4} \times C_{\#4}$ respectively. The information symbol 17 of the one frame 15 has j of 511. Accordingly, 511 pieces of the logical multiplications $C_{\#1} \times C_{\#1}$, $C_{\#2} \times C_{\#2}$, $C_{\#3} \times C_{\#3}$ and $C_{\#4} \times C_{\#4}$ totally output.

These logical multiplications $C_{\#1} \times C_{\#1}$, $C_{\#2} \times C_{\#2}$, $C_{\#3} \times C_{\#3}$ and $C_{\#4} \times C_{\#4}$ are respectively input to the integral networks $42_{\#1}, 42_{\#2}, 42_{\#3}$ and $42_{\#4}$. The integral networks $42_{\#1}, 42_{\#2}, 42_{\#3}$ and $42_{\#4}$ carry out the integral calculations based on the logical multiplications $C_{\#1} \times C_{\#1}$, $C_{\#2} \times C_{\#2}$, $C_{\#3} \times C_{\#3}$ and $C_{\#4} \times C_{\#4}$, and output the resulted integral signals.

The integral signals are respectively input to a integral signal comparing apparatus 43. The integral signal comparing apparatus 43 has a look up table which has already been prepared. In the look up table, there is a specified corresponding relation between the two bit data and an integrated peak value.

The two bit data "00" is arranged to correspond to the integrated peak value P1. The two bit data "01" is arranged to correspond to the integrated peak value P2. The two bit data "10" is arranged to correspond to the integrated peak value P3. The two bit data "11" is arranged to correspond to the integrated peak value P4. The integral signal comparing apparatus 43 refers to the peak value of the input integral signal and based on that which peak value of P1–P4 is input, outputs the two bit data which corresponds to the peak value to a data demodulating apparatus 44. The data demodulating apparatus 44 judges a sign "+" or "−" t of the two bit data and outputs a set of three bit data including the sign to the upper application layer 41.

When the packet CDMA transmitter 6 of the base station 1 shown in FIG. 6 and the mobile station #1 shown in FIG. 7 are utilized, more higher speed transmission can be realized during the downlink from the base station 1 to mobile station #1 because twelve times of amount of information can be transmitted at a time In other words, the information of 6132 bit can be sent from the base station 1 to the mobile station #1 at a time when in the case 1 symbol per 1 bit modulation method is employed.

[Third Example of a Structure for the Packet CDMA Transmitter 6]

Figure 8:
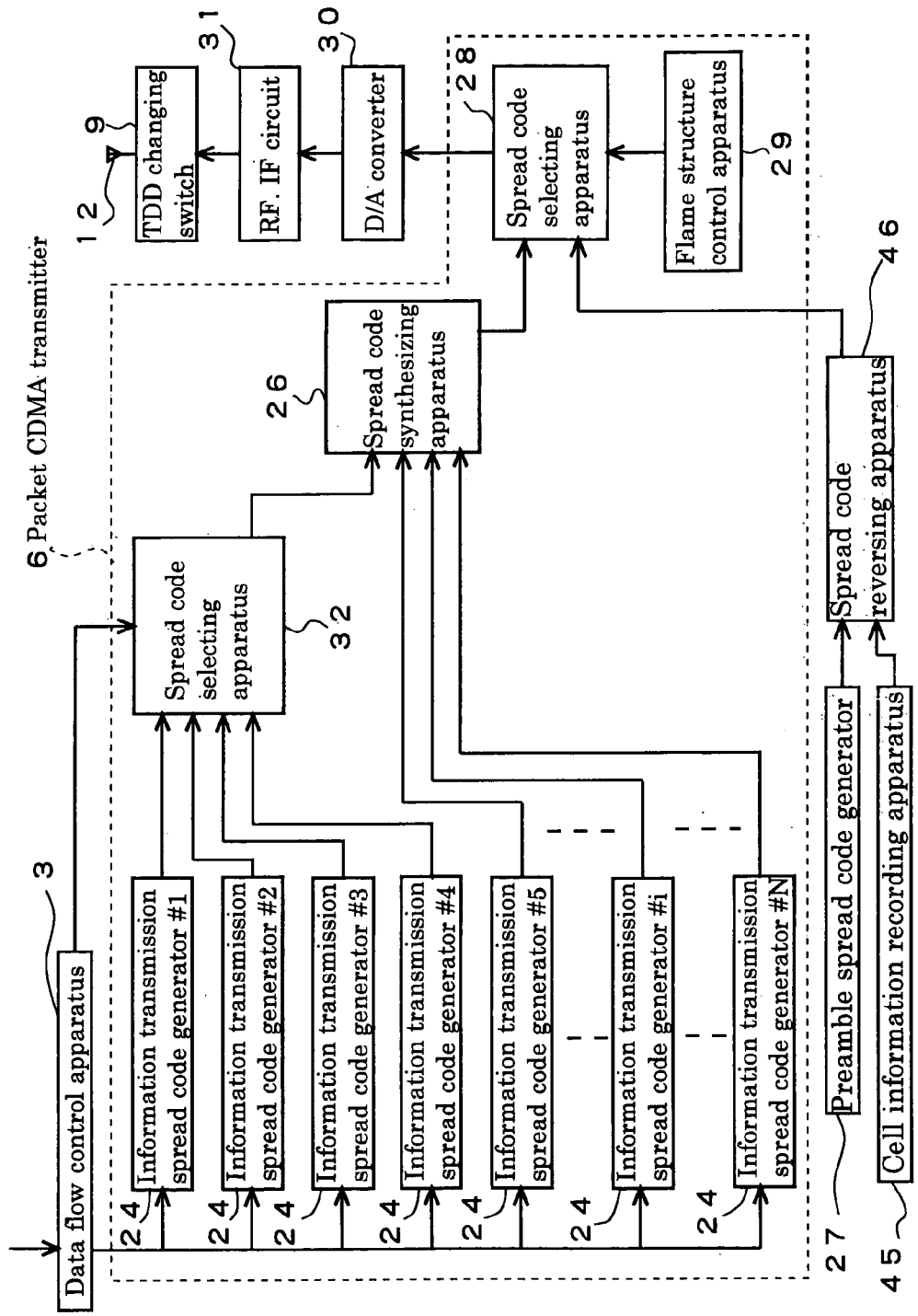
FIG. 8 is a block diagram which shows a third example of structure for the packet CDMA transmitter shown in FIG. 1.

FIG. 8 is an explanatory diagram which shows a third example of structure for the packet CDMA transmitter 6. In this embodiment, the packet CDMA transmitter is arranged to transmit the common data to all mobile stations #1, #5, ..., #N in the preamble block with modulation by "+" and "−" on the preamble block 13 shown in FIG. 9.

In this embodiment, the packet CDMA transmitter 6 is arranged to include a cell information recording apparatus 45. In the cell information recording apparatus 45, a control information which controls the information transmission spread code generators of the respective mobile stations #1, #5, ..., #N within the cell 2, and a control information which controls the frequency of the RF.IF circuit 33 are recorded. The respective barker codes in the preamble block 13 which are generated by the preamble spread code generator 27, are input into a spread code reversing apparatus 46. The spread code reversing apparatus 46 reverses a sign of the respective barker codes in the preamble block 13 based on the control information in the cell information recording apparatus 45, and outputs them to the spread code selecting apparatus 28.

Figure 9:
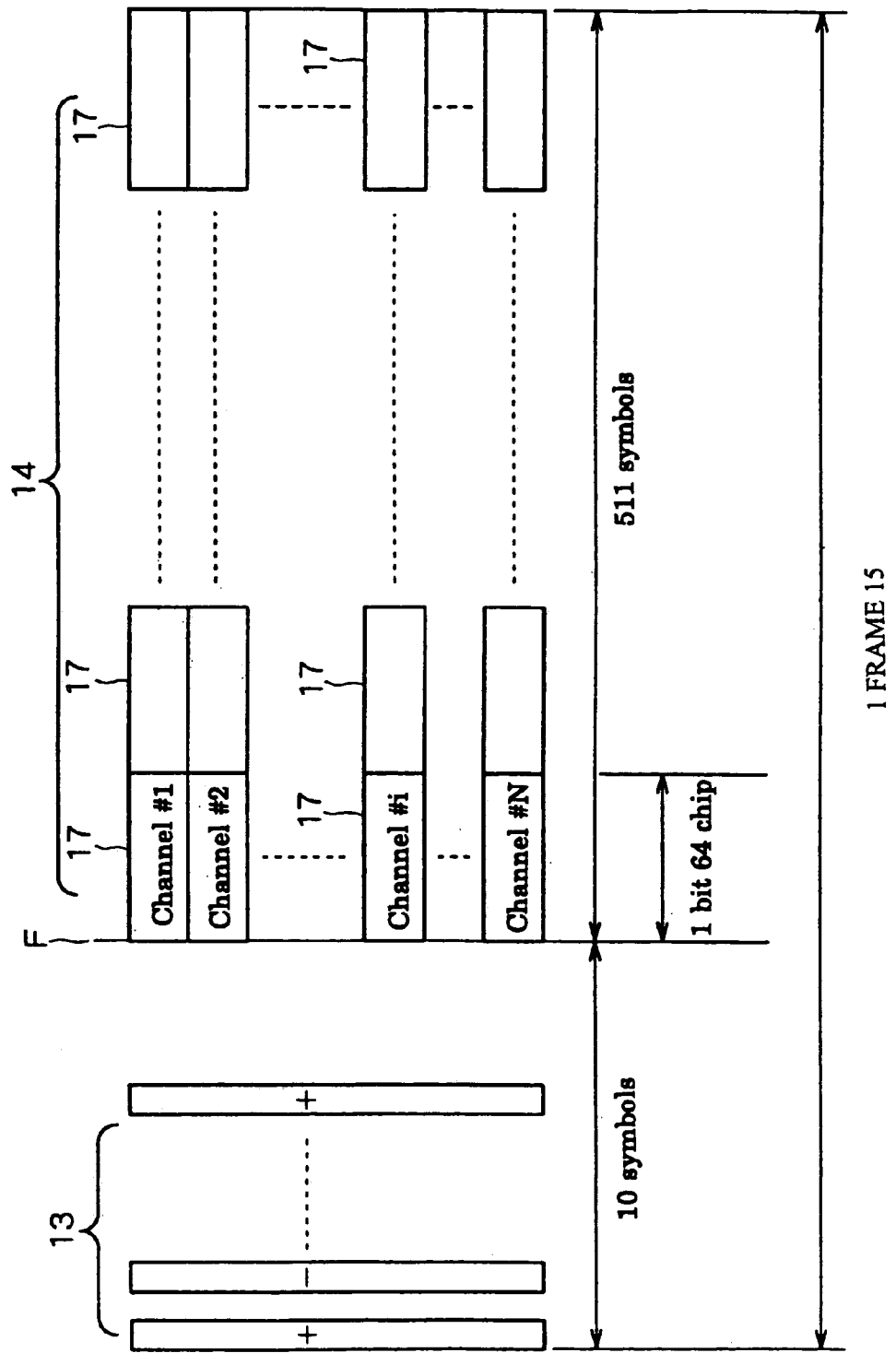
FIG. 9 is a diagram which shows a format of the one frame of the packet CDMA used for the packet CDMA transmitter shown in FIG. 8.

The spread code selecting apparatus 28 composes the one frame 15 shown in FIG. 9 based on the controlling by the frame control apparatus 29. The data which are made up from the one frame 15, are modulated and achieved a downlink to respective mobile stations #1, #5, . . . , #N within the cell 2 of the base station 1 from the transmitting/receiving antenna 12 for communication within the cell. Because the other structure of the embodiment is the same as the packet CDMA transmitter 6 shown in FIG. 6, the detailed description will be omitted.

In this embodiment, though the structure was employed in which the cell information recording apparatus 45 and the spread code reversing apparatus 46 are provided within the packet CDMA transmitter 6 shown in FIG. 6, another structure may be applicable in which the cell information recording apparatus 45 and the spread code reversing apparatus 46 are provided within the packet CDMA transmitter 6 shown in FIG. 4.

[Third Example of a Structure for the Mobile Station #1]

Figure 10:
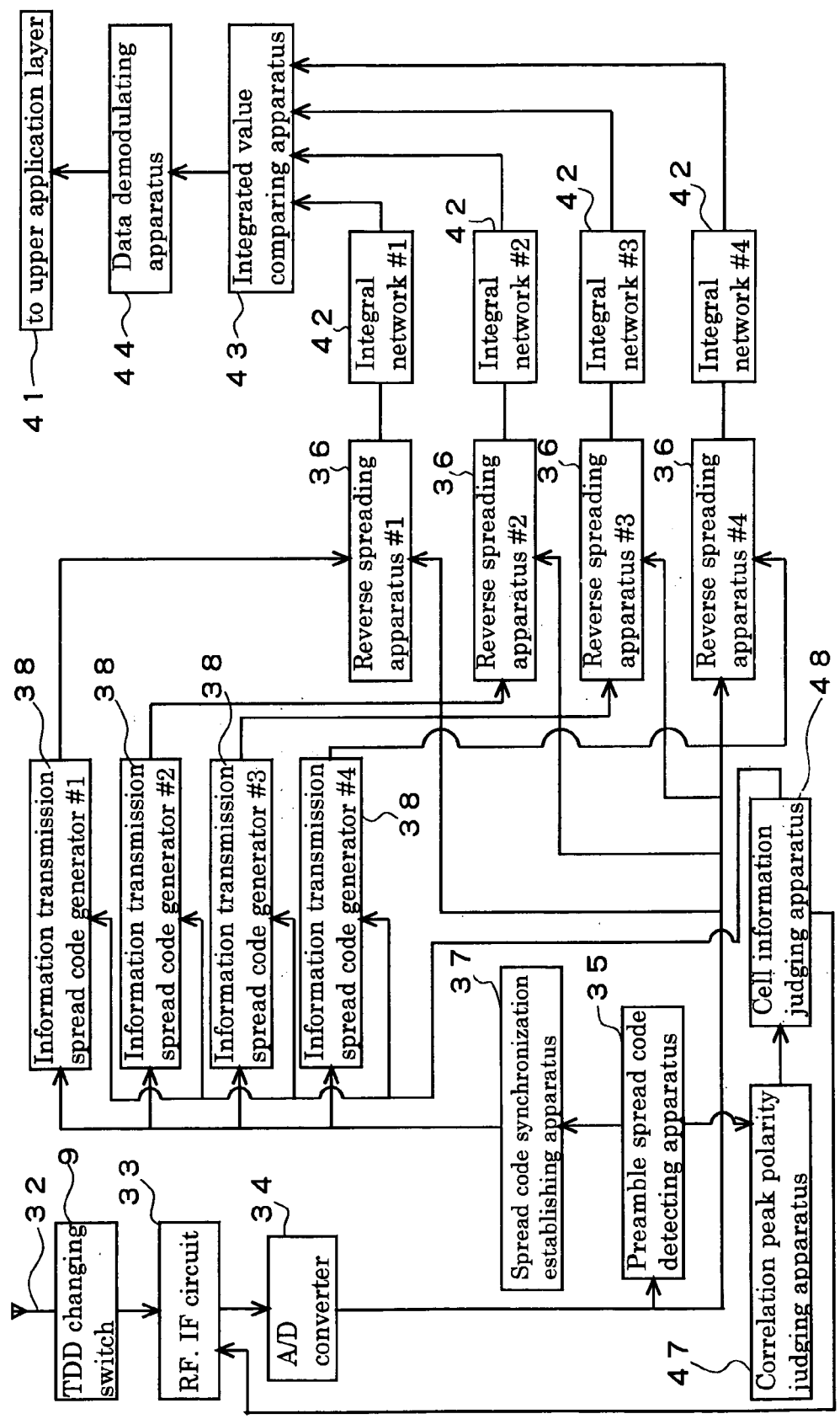
FIG. 10 is a block diagram which shows an example of structure for a receiver of the mobile station corresponding to the packet CDMA transmitter shown in FIG. 8.

FIG. 10 is a block diagram of a third example of structure for a receiver of the mobile station #1. In this third example of structure, the receiver of the mobile station #1 is provided with a cell information judging circuit 48 and a correlation peak polarity judging circuit 47 which is arranged to judge a polarity "+" or "−" of the barker code in the preamble block 13. The other structure of this embodiment is the same as that of the receiver of the mobile station #1 shown in FIG. 7. According to this fact, the description will be given on the portions which are different and the detailed description of the receiver of the mobile station #1 in the third example of the structure will be omitted.

The preamble spread code detecting apparatus 35 outputs a detected output of the preamble block 13 to the spread code synchronization establishing apparatus 37 and at the same time outputs it to the correlation peak polarity judging circuit 47. The correlation peak polarity judging circuit 47 judges the polarity "+" or "−" of the barker code, and outputs the judged result to the cell information judging circuit 48. The cell information judging circuit 48 judges what kind of control information was sent from the cell information recording apparatus 45 of the base station 1, based on the judged result by the correlation peak polarity judging circuit 47.

In this embodiment the cell information judging circuit 48 outputs the control information to the information transmission spread code generator $38_{\#1}$–$38_{\#4}$ and the RF. IF circuit 33 to control them. By this arrangement the information transmission spread code generator $38_{\#1}$–$38_{\#4}$ and the RF. IF circuit 33 are controlled based on this control information.

According to this structure of a combination with the packet CDMA transmitter 6 shown in FIG. 8 and the mobile station #1 shown in FIG. 10, because the information which is common to the respective mobile stations, can be transmitted utilizing the unused preamble block 13 for transmission of the information, the efficiency of use of the information transmission can be improved in such extent.

[First Example of a Structure for the Transmitter of the Mobile Station #1]

Figure 11:
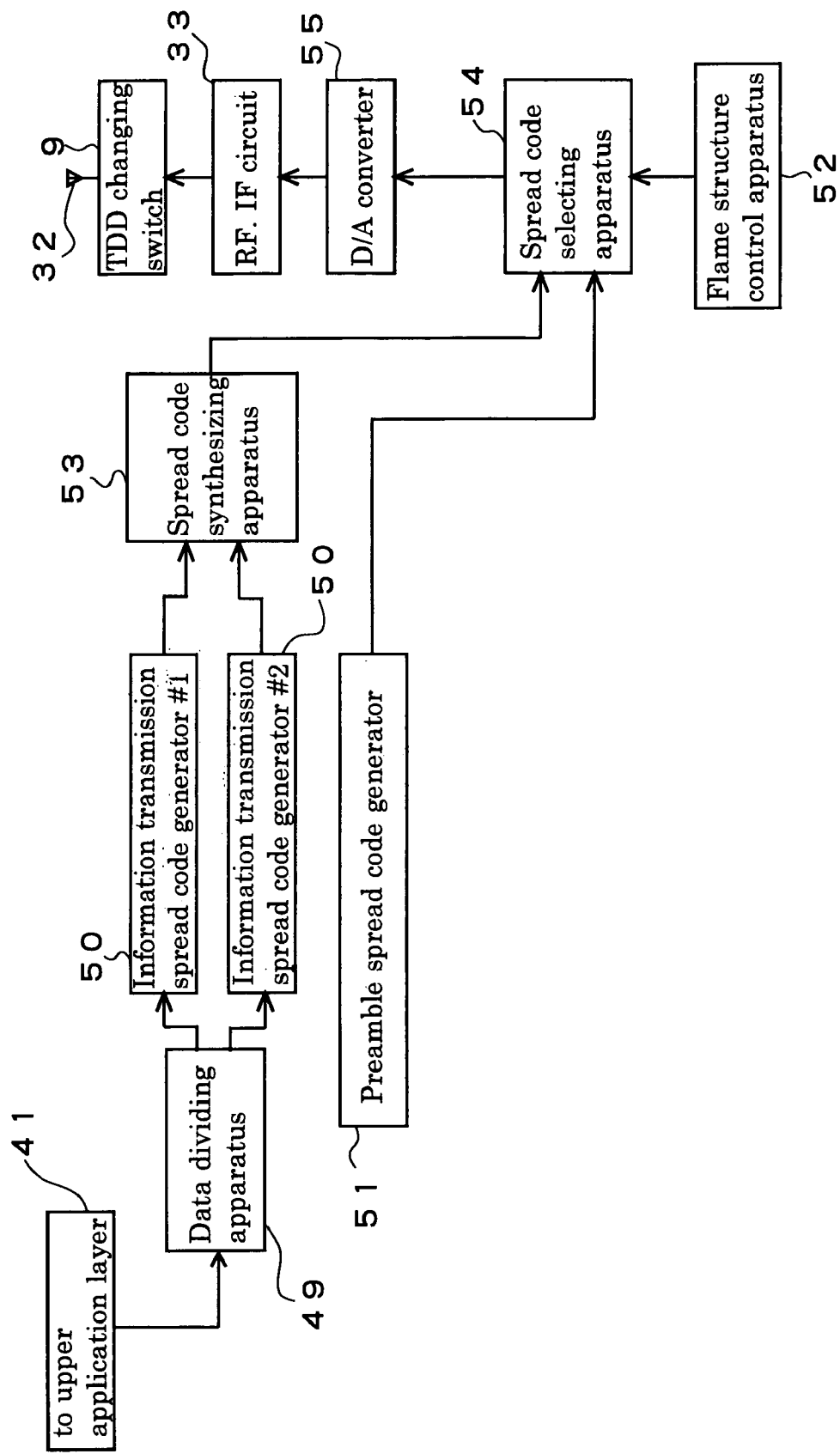
FIG. 11 is a block diagram which shows a first example of structure for a transmitter of the mobile station.

In this embodiment the mobile station #1 comprises a data dividing apparatus 49, an information transmission spread code generator 50, a preamble spread code generator 51, a frame structure controller 52, a spread code synthesizing apparatus 53, a spread code selecting apparatus 54 and a D/A converter 55, as shown in FIG. 11.

The upper application layer 41 outputs the data to the data dividing apparatus 49. The data dividing apparatus 49 achieves the function to divide the data into two portions utilizing the #1 channel and #2 channel. A front portion of the divided data are input to information transmission spread code generator $50_{\#1}$. A back portion of the divided information is input to the information transmission spread code generator $50_{\#2}$.

Figure 12A:
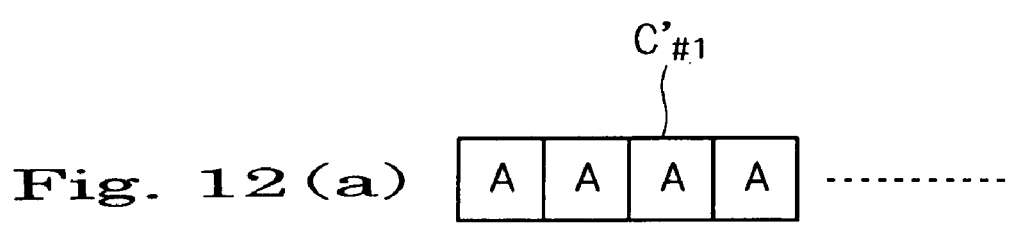
FIG. 12(*a*) is a diagram showing an example of the information transmission spread code data used in the uplink, and shows one example of the information transmission spread code data.
Figure 12B:
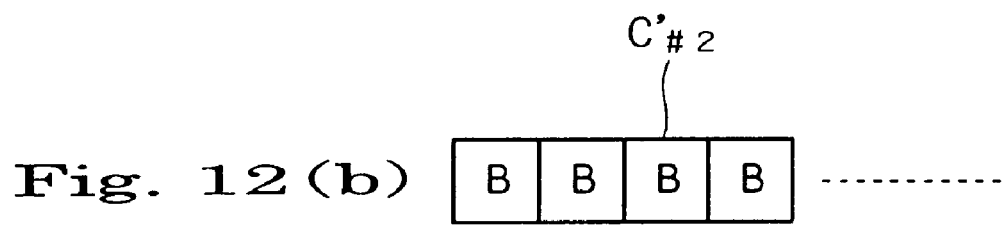

The information transmission spread code generator $50_{\#1}$ generates the information transmission spread code data $C'_{\#1}$ shown in FIG. 12(a) in every 1 symbol. The information transmission spread code generator $50_{\#2}$ generates the information transmission spread code data $C'_{\#2}$ shown in FIG. 12(b) in every 1 symbol. These information transmission spread code data $C'_{\#1}$ and $C'_{\#2}$ are input to the spread code generator 53. The spread code generator 53 makes an arithmetic addition of information transmission spread code data $C'_{\#1}$ and $C'_{\#2}$ and outputs $SUM_j$ (j is an integer from 1 to 511) to compose an information block 20 consisted of 511 symbols.

The preamble spread code generator 51 generates an information symbol 21 of the preamble block 19 shown in FIG. 3. A signal making the information symbol 21 is input in combination with the arithmetic addition data $SUM_j$ to the spread code selecting apparatus 54. The spread code selecting apparatus 54 makes the one frame 18 (see FIG. 3) consisting of the data of the preamble block 19 and the data of the information block 20 by the flame structure controlling apparatus 52. This one frame 18 is an approximate synchronized CDMA signal consisting of the repetition of the same codes which have 16 chips in units.

The data making the one frame 18 is input to the D/A converter 55. The D/A converter 55 converts with digital to analog conversion meted the approximate synchronized CDMA data consisting of the one frame 18. The analog signal is modulated by the RB. IF circuit 33, and transmitted (uplink) from the transmitting/receiving antenna 32 to the base station 1.

[First Example of a Structure for the AS-CDMA Receiver 7 of the Base Station 1]

Figure 13:
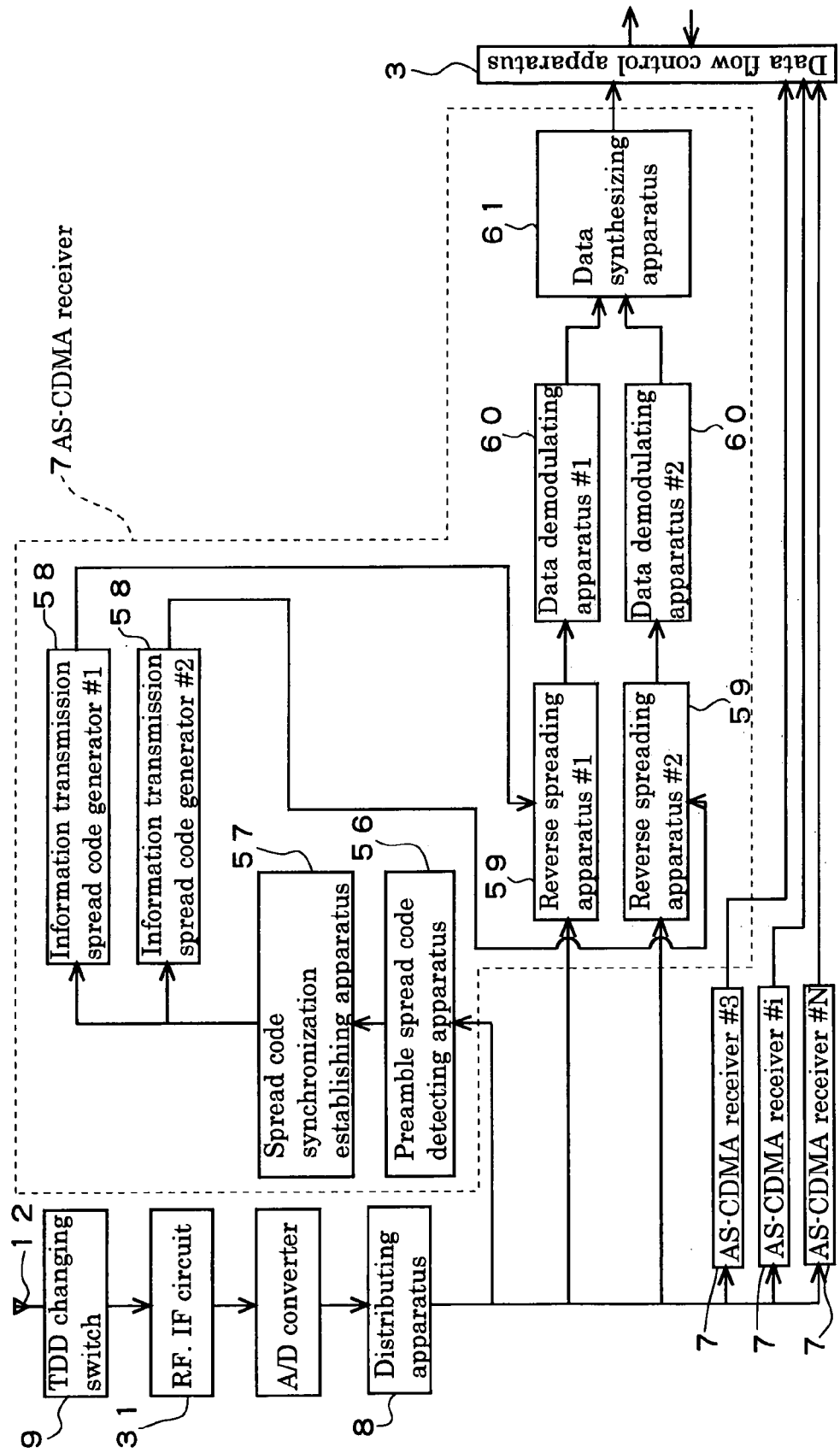
FIG. 13 is a block diagram which shows an example of structure for an AS-CDMA receiver of the base station corresponding to the mobile station shown in FIG. 11.

FIG. 13 is a block diagram of an AS-CDMA receiver $7_{\#1}$ corresponding to the mobile station #1 shown in FIG. 11.

In this embodiment the AS-CDMA receiver 7 comprises a preamble spread code detecting apparatus 56, a spread code synchronization establishing apparatus 57, information transmission spread code generator $58_{\#1}$, $58_{\#2}$, reverse spreading apparatus $59_{\#1}$, $59_{\#2}$, data demodulation apparatus $60_{\#1}$, $60_{\#2}$ and a data synthesizing apparatus 61.

The function of the preamble spread code detecting apparatus 56, the spread code synchronization establishing apparatus 57, the information transmission spread code generators $58_{\#1}$, $58_{\#2}$, the reverse spreading apparatus $59_{\#1}$, $59_{\#2}$, the data demodulation apparatus $60_{\#1}$, $60_{\#2}$ and the data synthesizing apparatus 61 are the same as that of the preamble spread code detecting apparatus 35, the spread code synchronization establishing apparatus 37, the information transmission spread code generator $38_{\#1}$, $38_{\#2}$, the reverse spreading apparatus $36_{\#1}$, $36_{\#2}$, the data demodulating apparatus $39_{\#1}$, $39_{\#2}$ and the data synthesizing apparatus 40. In this example it is arranged that the data which are divided in two portions and sent from the mobile station #1 at a time, are combined in one by the data synthesizing apparatus 61 and output to the data flow control apparatus 3.

[Second Example of a Structure for the Transmitter of the Mobile Station #2]

Figure 14:
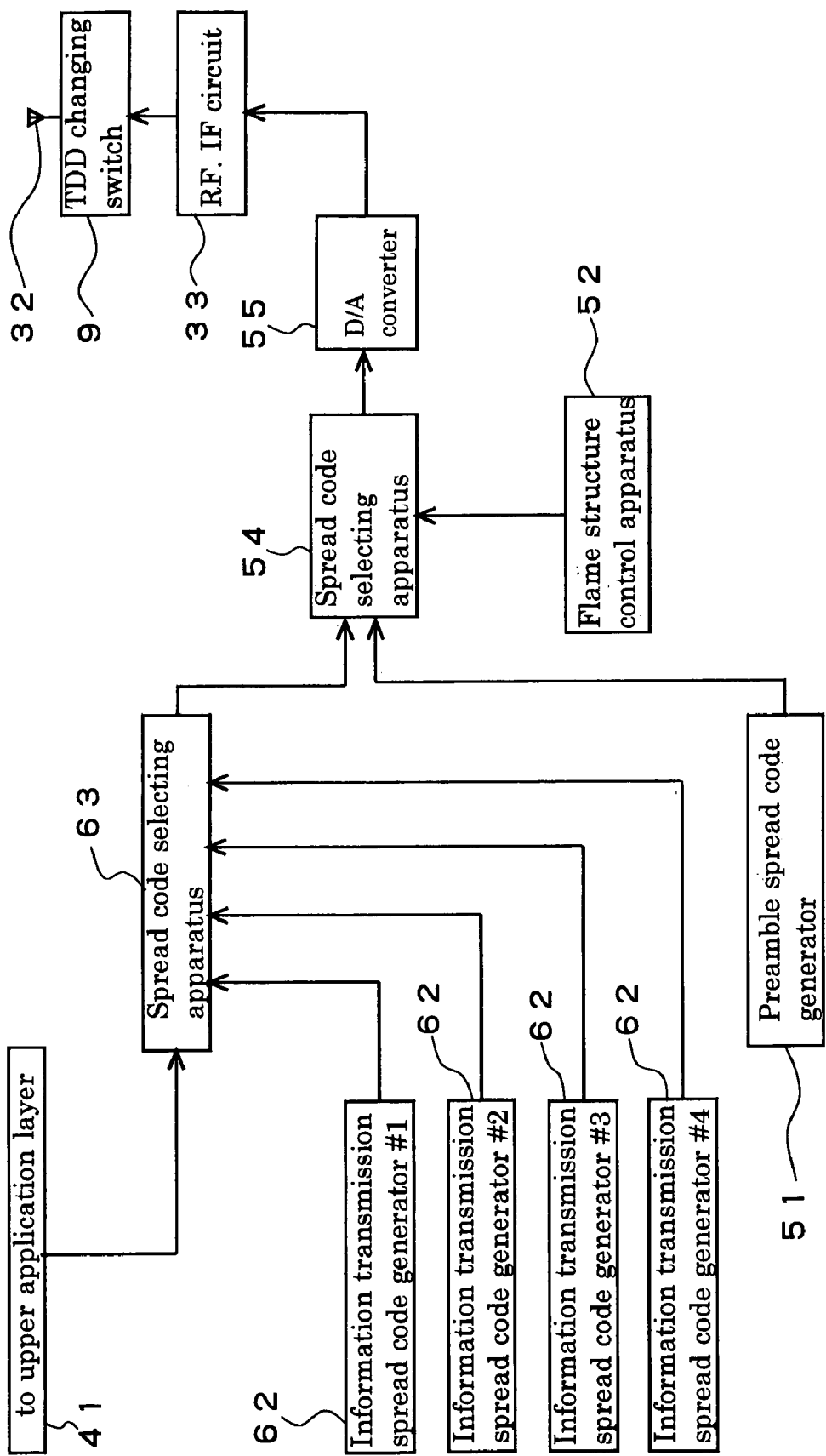
FIG. 14 is a block diagram which shows a second example of structure for a transmitter of the mobile station.

FIG. 14 is a block diagram which shows a second example of a structure for a transmitter of the mobile station #1. In this example, it is arranged that the transmitter comprises the information transmission spread code generator $62_{\#1}$–$62_{\#4}$ and spread code selecting apparatus 63, and the transmitter can achieve the uplink of the information from the mobile station #1 to the base station 1 using 4 channels at a time. The data output from the upper application layer 41 is divided in four portions. To the respective portions of the four divided data, the information transmission spread code which are generated by the information transmission spread code generator $62_{\#1}$–$62_{\#4}$ are assigned by the spread code selecting apparatus 63.

The spread code selecting apparatus 63 outputs the information transmission spread code data to the spread code selecting apparatus 54 based on the information transmission spread code data which are output from the information transmission spread code generator $62_{\#1}$–$63_{\#4}$ and the data which are output from the upper application layer 41. The spread code selecting apparatus 54 combines the data of the preamble block 19 and the data of the information block 20 based on the frame structure controlling apparatus 52, and makes the one frame 18. Then the spread code selecting apparatus 54 outputs the data of the one frame 18 to the D/A converter 55. The D/A converter 55 converts the data of the one frame 18 to an analog signal. The analog signal is modulated by the RF. IF circuit 33 and transmitted (uplink) to the base station 1.

According to the transmitter of the mobile station #1 shown in FIG. 14, it is arranged that the information is sent using four channels at a time.

[Second Example of a Structure for the AS-receiver 7 of the Base Station 1]

Figure 15:
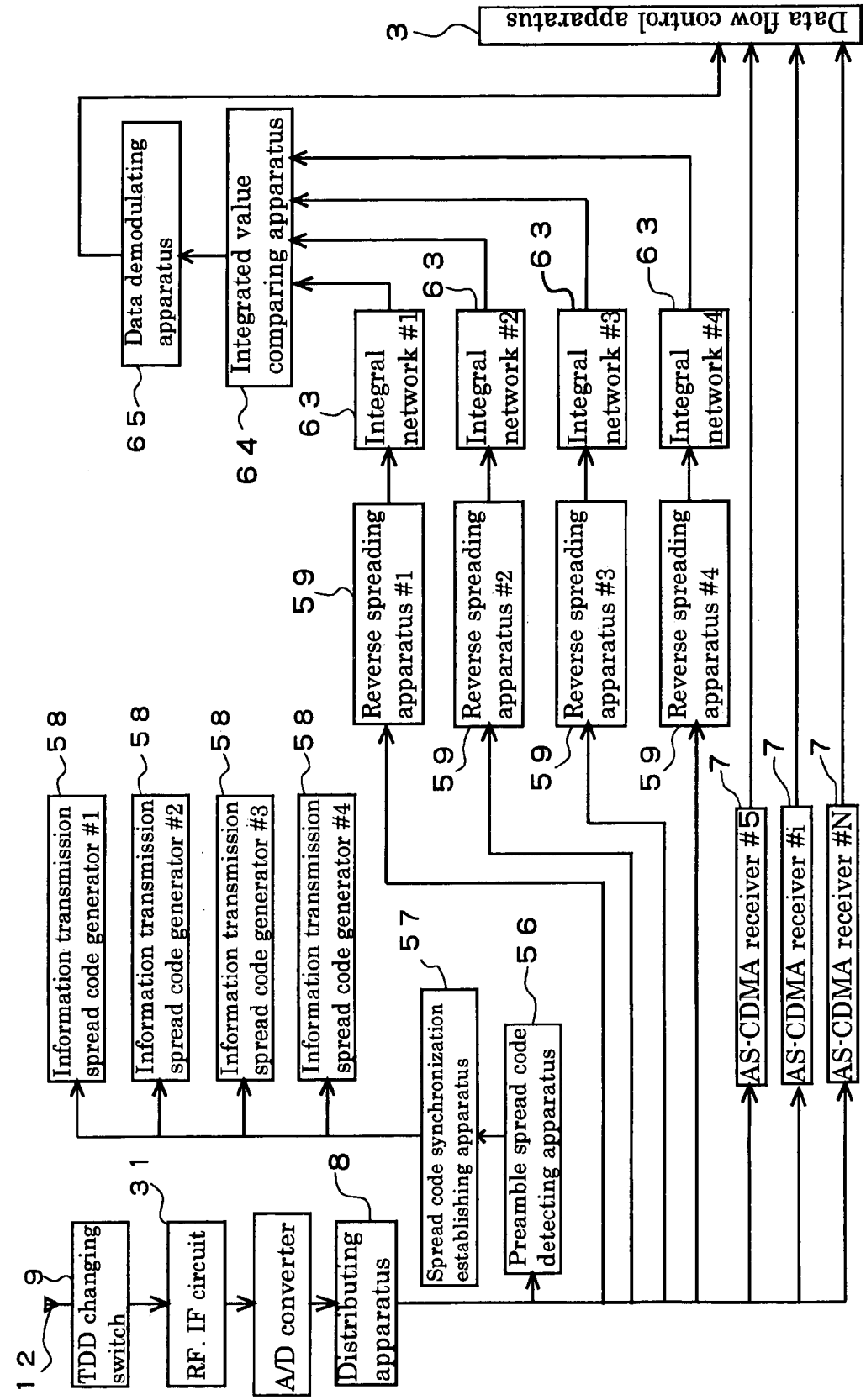
FIG. 15 is a block diagram which shows an example of structure for an AS-CDMA receiver of the base station corresponding to the mobile station shown in FIG. 14.

FIG. 15 is a block diagram which shows a second example of structure for an AS-CDMA receiver $7_{\#1}$ of the base station 1. This AS-receiver 7 is made to receive data of the one frame 18 sent from the transmitter of the mobile station #1 shown in FIG. 14.

In components which constitute the AS-CDMA receiver $7_{\#1}$, the same components as the AS-CDMA receiver $7_{\#1}$ which is shown is FIG. 13, are designated at the same numerals, and detailed description will be omitted for the same components and only different components will be explained.

The AS-CDMA receiver $7_{\#1}$ which is shown in FIG. 15, comprises the integral networks $63_{\#1}$, $63_{\#2}$, $63_{\#3}$ and $63_{\#4}$, the integral signal comparing apparatus 64 and the data demodulating apparatus 65.

The function of the integral networks $63_{\#1}$, $63_{\#2}$, $63_{\#3}$ and $63_{\#4}$, the integral signal comparing apparatus 64 and the data demodulating apparatus 65 are the same as that of the integral networks $42_{\#1}$, $42_{\#2}$, $42_{\#3}$ and $42_{\#4}$, the integral signal comparing apparatus 43 and the data demodulating apparatus 44 shown in FIG. 7. The data which are sent using four channels from the mobile station #1, are combined to one portion by the data demodulating apparatus 65, and output to the data flow control apparatus 3.

[Modification Example for the Base Station 1]

Figure 16:
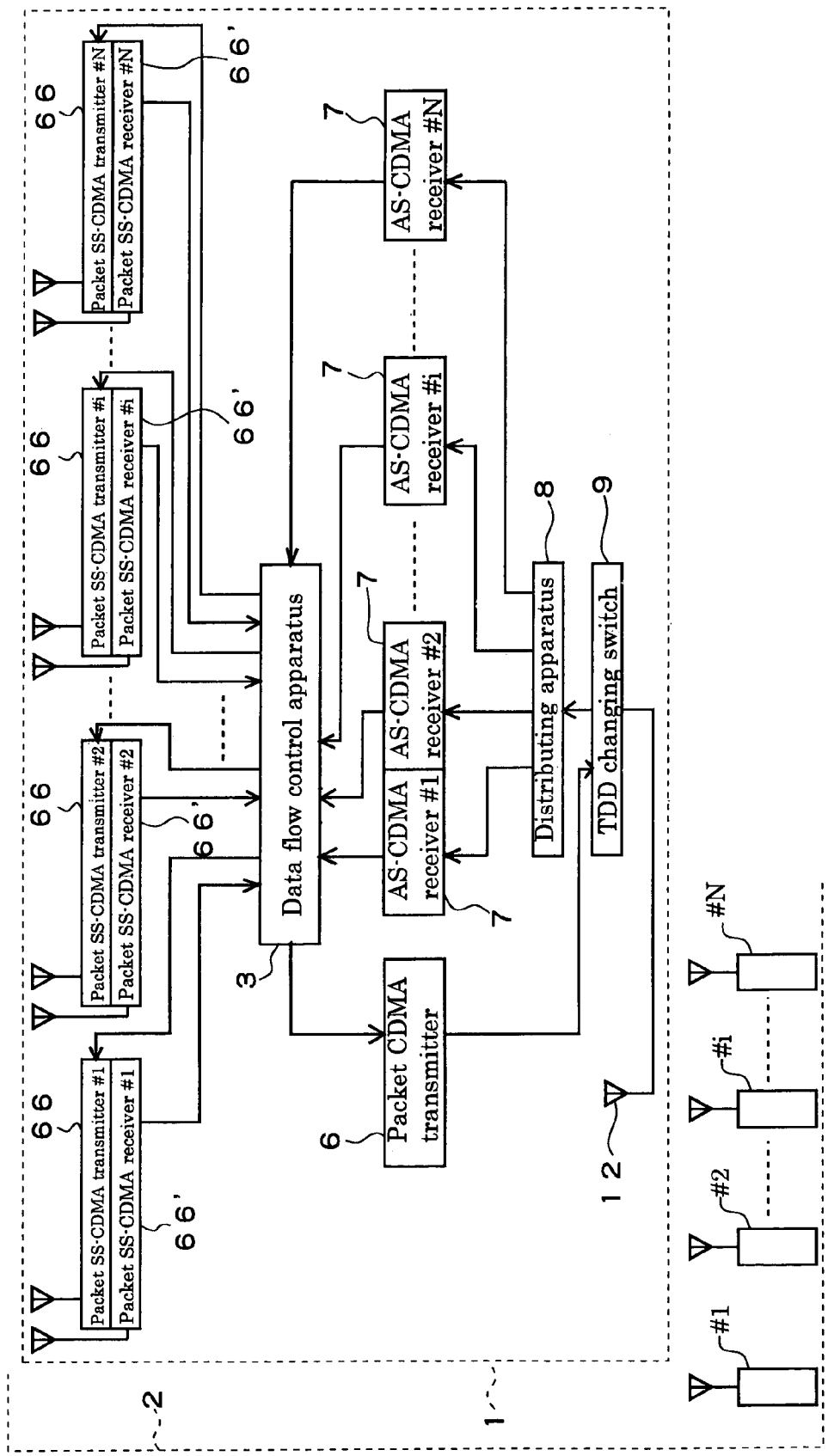
FIG. 16 is a block diagram which shows a variation of the base station shown in FIG. 1.

In a modification example for the base station 1 shown in FIG. 16, a structure is employed that a packet SS-CDMA transmitter $66_{\#1}$ and a packet SS-CDMA receiver $66'_{\#1}$ are utilized instead of the OFDM transmitter $4_{\#1}$ and the OFDM receiver $5_{\#1}$ shown in FIG. 1 for the wireless communication from the base station 1 to other base station. Because the other components are the same as the components shown in FIG. 1, the same components are given the same numerals and their detailed description will be omitted.

[Embodiment 2]

[Example of a Structure for the Transmitter/receiver of the Base Station 1]

Figure 17A:
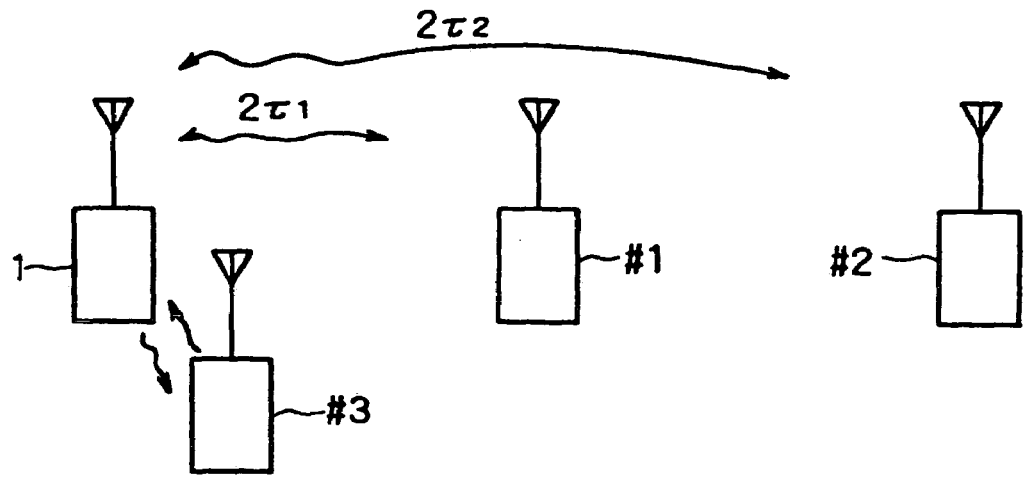
FIG. 17(*a*) is an explanatory diagram of the transmission delay time during a communication between the base station and the mobile station, and it is a diagram schematically showing a location of the mobile station with regard to the base station.

This embodiment relates to a case where the mobile stations #1, #2 and #3 are transmitting to the base station 1 at the same time as shown in FIG. 17(a). It is supposed that the mobile station #2 is located in a position which is farer than the mobile station #1 and the farthest within the cell from the base station 1 having the distance r. The mobile station #3 is supposed to be located near the base station 1. The mobile station #1 is supposed to be located in the middle point (with a distance of one half of r) between the mobile station #2 and the base station 1.

In this case, because the distance between the base station 1 and the mobile station #3 is almost zero, the transmission delay time can be ignored. In other words, the base station 1 receives the information at the same time of the transmission by the mobile station #3. In comparison with this, because the mobile station #1 is located in the position with the distance r/2 from the base station 1, the base station 1 is made to receive the transmission from the mobile station #1 after a delay of τ1. Because the mobile station #2 is located in the position with the distance r from the base station 1, the base station 1 is made to receive the transmission from the mobile station #2 after a delay of τ2 (2 τ1).

Figure 17B:
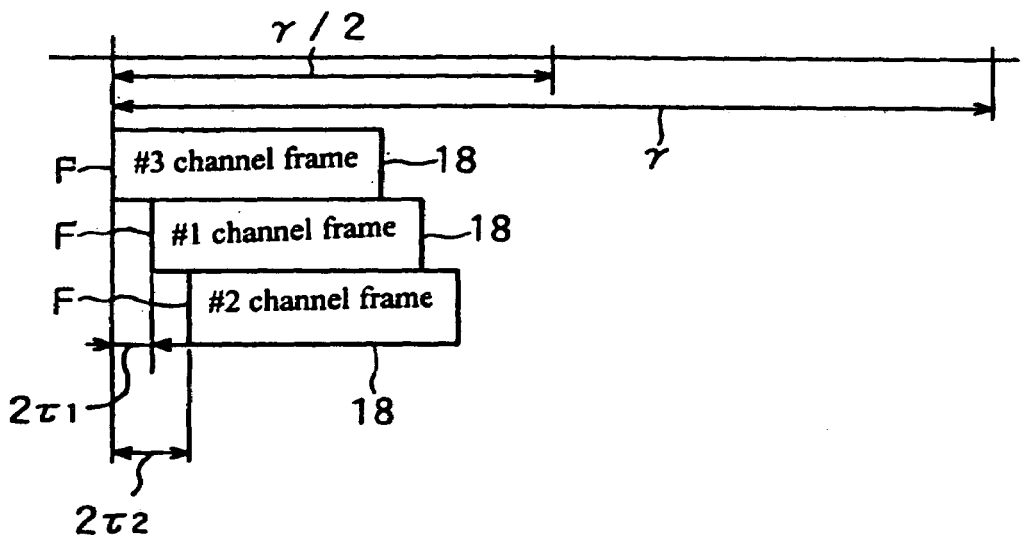

According to these facts, though a communication (downlink) is made from the base station 1 to the respective mobile stations #1–#3 at a time, the respective top ends F of the one frame 18 which are returned from the respective mobile stations #1–#3 have a discrepancy as shown in FIG. 17(b) during the uplink.

When the top ends F of the one frame 18 have a discrepancy during the uplink, it is difficult for the base station 1 of the respective mobile stations #1–#3 to control a time management.

Figure 18:
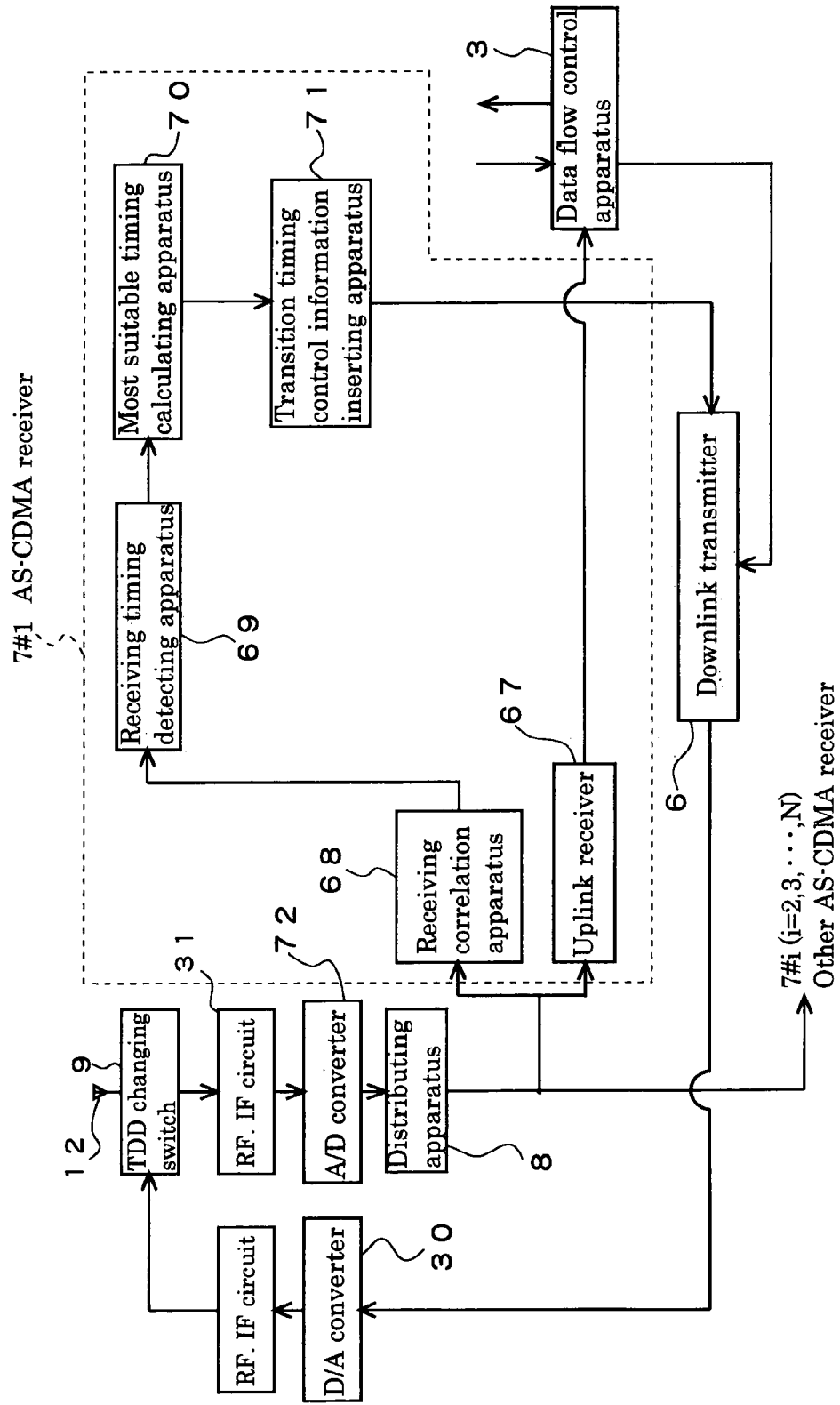
FIG. 18 is a block diagram which shows an example of structure for a transmitter/receiver of the base station to solve the problem around the transmission delay time between the base station and the mobile station.

To avoid this problem, the respective AS-CDMA receivers $7_{\#1}$ of the base station 1 are designed to have a structure as shown in FIG. 18. This AS-CDMA receiver $7_{\#1}$ comprises an uplink receiver 67, a receiving correlation apparatus 68, a receiving timing detecting apparatus 69, a most suitable timing calculating apparatus 70 and a transmission timing control information inserting apparatus 71. In this embodiment, the downlink transmitter 6 is also the packet CDMA transmitter and it is commonly used by all the mobile stations #i.

When a transmission (downlink) is made to the mobile stations #i from the base station 1, for example to the mobile station #1, the information is received by the mobile station #1 with time delay of τ1. The base station 1 receives a transmission (uplink) from the mobile station #1 with time delay of τ1, too. The information is converted from analog to digital by the A/D converter 72, and input through the TDD changing apparatus 72 and the distributing apparatus 8 to the uplink receiver 67 and the receiving correlation apparatus 68. The uplink receiver 67 is provided with, for example, the preamble spread code detecting apparatus 56, the spread code synchronization establishing apparatus 57, the information transmission spread code generator $58_{\#1}$, $58_{\#2}$, the reverse spreading apparatus $59_{\#1}$, $59_{\#2}$, the data demodulation apparatus $60_{\#1}$, $60_{\#2}$ and the data synthesizing apparatus 61. The uplink receiver 67 achieves a function to demodulate the data transmitted from the mobile station #1.

The receiving correlation apparatus 68 is composed by, for example, a matched filter which detects a correlation. The receiving correlation apparatus 68 detects a correlation of the data. The correlation signal of it is input to the receiving timing detection apparatus 69. The receiving timing detection apparatus 69 calculates the time delay 2 τ1 between the base station 1 and the mobile station #1 based on the correlation signal, and outputs the result to the most suitable timing calculating apparatus 70.

The most suitable timing calculating apparatus 70 calculates the most suitable timing which is required by the base station 1based on the delay time 2 τ1, and outputs the result to the transmission timing control information inserting apparatus 71.

Herein, the term transmission timing control information means a control information to control the transmission timing of the mobile station #1. The transmission timing control information inserting apparatus 71 outputs a transmission timing control information of chip level to the downlink transmitter 6. The downlink transmitter 6 makes data consisting of the one frame 15 including, for example, the barker code 13 shown in FIG. 2 in which the timing control information of chip level is inserted. The data consisting of the one frame 15 are output through the TDD changing apparatus 9 to the D/A converter 30. The D/A converter 30 converts the data from that of digital to that of analog. The converted analog data is modulated by frequency modulation method, and is downlinked to the mobile station #1.

Figure 17C:
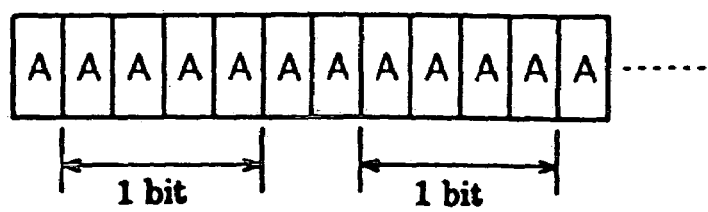

Herein, the approximate synchronized CDMA is arranged to avoid the cross talk caused by the difference of the delay time by means that it makes an information symbol as shown is FIG. 17(c) through adding the last code "A" or "−A" before the first code "A" or "−A" of a column of serial data "AAAA" or "−A−A−A−A" composing 1 bit, and at the same time it adds the first code "A" or "−A" after the last code "A" or "−A" of a column of serial data "AAAA" or "−A−A−A−A" composing 1 bit, and sends the data.

[Example of a Structure for the Transmitter/receiver of the Mobile Station #1]

Figure 19:
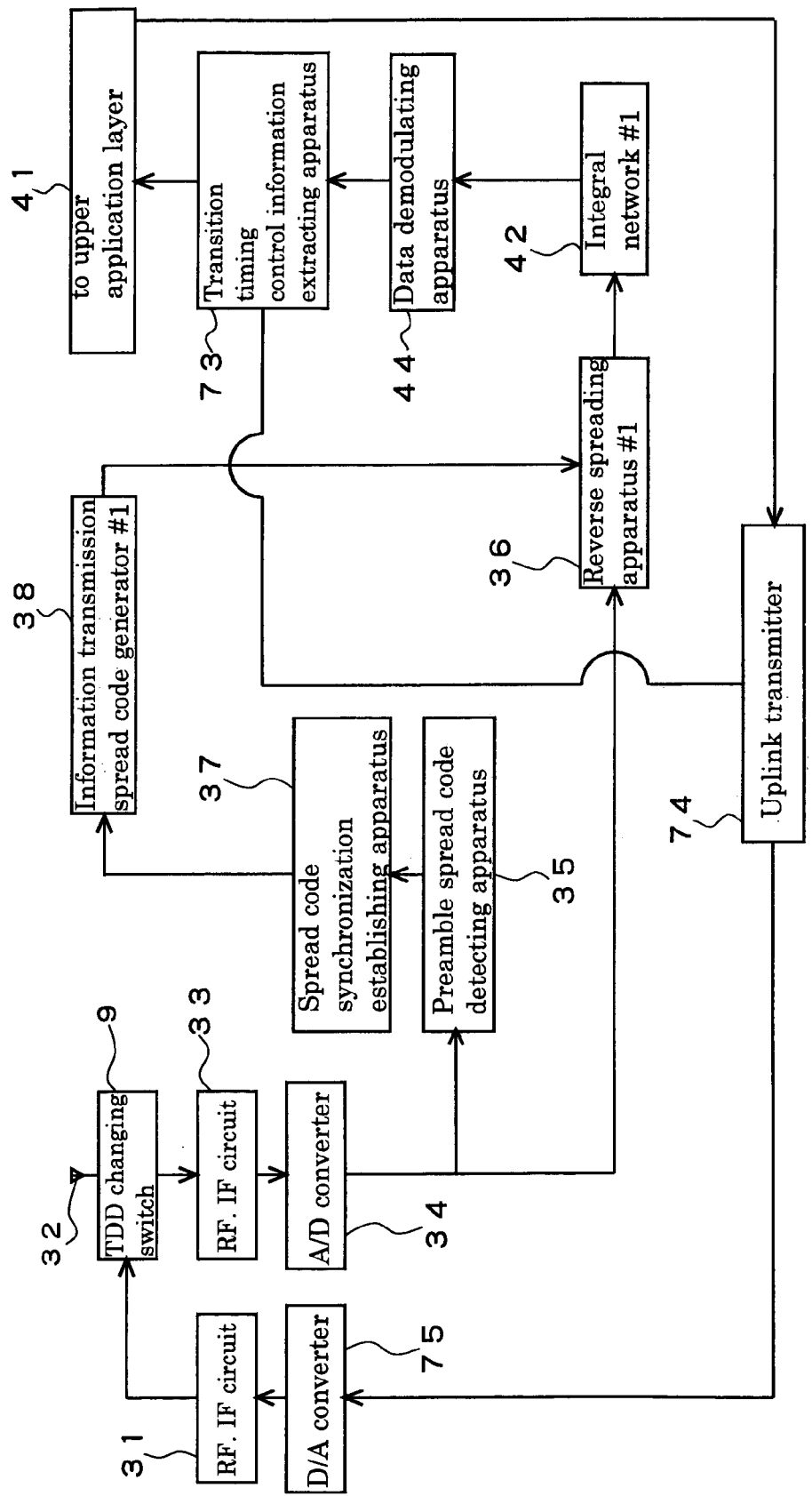
FIG. 19 is a block diagram which shows an example of structure for a transmitter/receiver of the mobile station corresponding to the transmitter/receiver of base station shown in FIG. 18.

FIG. 19 shows a structure for the transmitter/receiver of the mobile station #i, for example mobile station #1, corresponding to the transmitter/receiver of base station 1 shown in FIG. 18. This mobile station #1 shown in FIG. 19 is provided with a transmission timing control information extracting apparatus 73. The RF. IF circuit 33, the A/D converter 34, the preamble spread code detecting apparatus 35, the information transmission spread code generator $38_{\#i}$, the reverse spreading apparatus $36_{\#1}$, the integral network $42_{\#1}$ and the data demodulating apparatus 44 are the same as those in the structure shown in FIG. 5.

The timing control information is inserted in the data which are output from the data demodulating apparatus 44. The transmission timing control information extracting apparatus 73 achieves a function that it extracts the transmission timing control information inserted in the data.

The transmission timing control information extracting apparatus 73 outputs the transmission timing control information to the uplink transmitter 74. The uplink transmitter 74 transmits the data which are sent from the upper application in accordance with the transmission timing control information. The data which are output from the uplink transmitter 74 are converted from the digital form to the analog form by the D/A converter 75. The converted analog data are modulated by the frequency modulation method by the RF. IF circuit 33, and transmitted to the base station 1.

According to the second example, the delay time τ which is caused by the difference of distance from the mobile station #1 to the base station 1, is calibrated based on the transmission timing control information. By this arrangement, the discrepancy of top end portion F of the one frame 18 which is caused by the difference of distance from the mobile station #1 to the base station 1, can be prevented and the time base of all the mobile stations #i can be calibrated to the time base of the base station 1.

Also by this arrangement, it is convenient for a case when the information of the respective channels of #1–#N are sent by the arithmetic addition.

[Embodiment 3]

There are various kinds of obstacles on a way of the radio wave from the base station 1 to the mobile station #i. Because of this, even though the information is sent on a carrier wave with frequency f from the base station 1, the carrier wave with frequency f+Δf is received at the mobile station #i as a component of frequency error is mixed. When the information is received in a situation under the frequency with f+Δf is mixed, there is a fear that the cross talk may happen between the respective mobile stations.

Figure 20A:
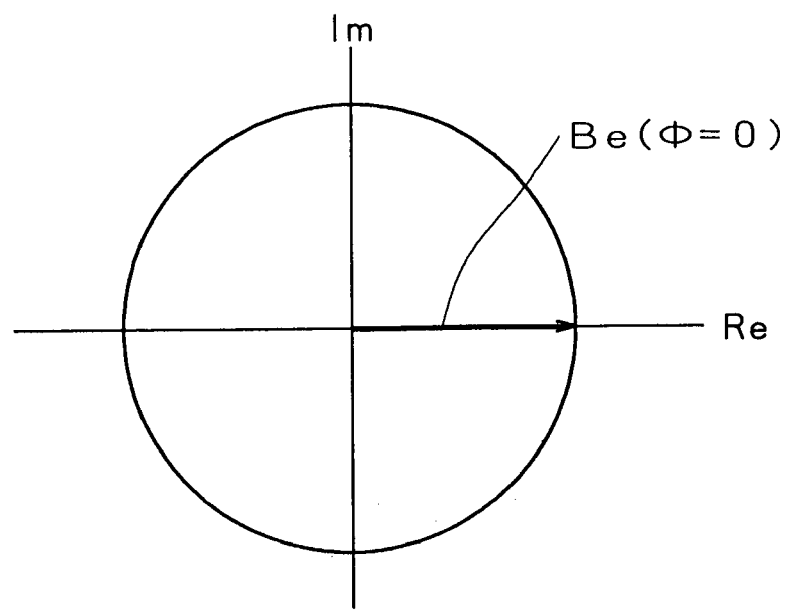
FIG. 20(*a*) is an explanatory diagram of a rotation vector with error on frequency and is an explanatory diagram of the phase of rotation vector at the base station.
Figure 20B:
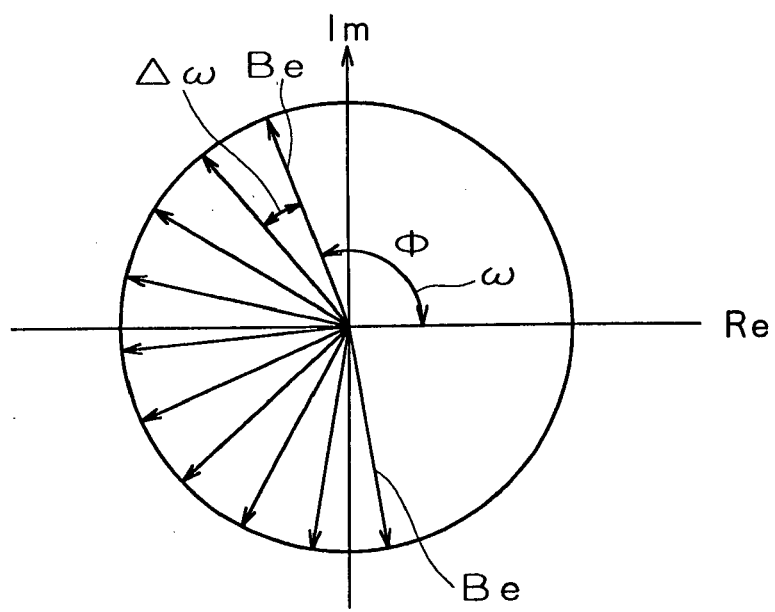

For example, even when the information is sent from the base station with the frequency f and the phase φ=0, the angular velocity ω (2 π/f) is caused to shift by an error Δ ω as shown in FIG. 20(a). Due to this fact, the information is caused to be received at the mobile station #i with the phase difference φ as shown in FIG. 20(b) when it is received. As a result, the cross talk is made to happen when the information from the base station 1 is received at the mobile station #i.

Herein, Re designates the real axis, Im designates the imaginary axis and Be designates the rotational vector in FIG. 20.

Figure 21:
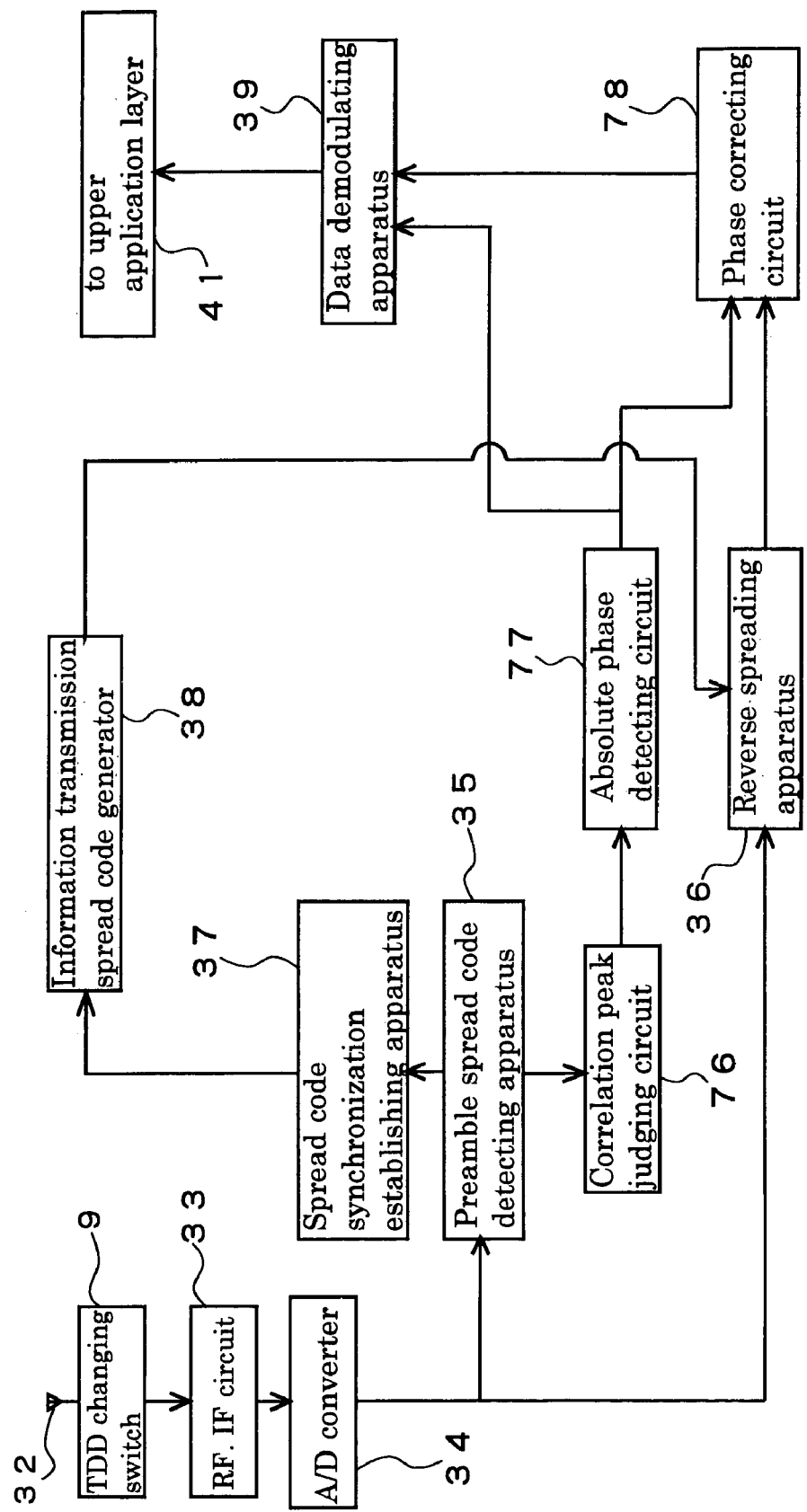
FIG. 21 is a block diagram which shows an example of structure for the receiver of the mobile station to avoid a cross talk in connection with the error on frequency.

FIG. 21 is a block diagram of a third example of structure for the mobile station #i to avoid this cross talk.

The mobile station #i which is shown in FIG. 21, is provided with the preamble spread code detecting apparatus 35, the spread code synchronization establishing apparatus 37 and the information transmission spread code generators 38 which are the same as those of the mobile station #i shown in FIG. 5. The preamble spread code detecting apparatus 35 detects the barker code 13 as the preamble spread code and outputs the barker code data to the spread code synchronization establishing apparatus 37 and the correlation peak judging circuit 76.

The spread code synchronization establishing apparatus 37 generates a synchronization signal based on the barker code. The information transmission spread code generator $38_{\#j}$ generates the information transmission spread code data and outputs the information transmission spread code data to the reverse spreading apparatus $38_{\#i}$.

The correlation peak judging circuit 76 detects a change of time interval of the barker code based on the barker code. The error in the frequency Δf (the error Δω in the angular velocity ω) can be obtained by the change of time interval. In this embodiment, because the barker code has 10 symbols, ten rotational vectors Be can be obtained. The error Δ ω is calculated from the phase of these rotational vectors Be.

An output of the correlation peak judging circuit 76 is input to the absolute phase detecting circuit 77. The absolute phase detecting circuit 77 detects an absolute phase φ and the error in frequency. An output of the absolute phase detecting circuit 77 is input to a phase correcting circuit 78 and the data demodulating apparatus 39. The reverse spreading apparatus $36_{\#i}$ generates a logical multiplication data of the arithmetic addition data $SUM_j$ and the information transmission spread code data $C'_{\#1}$ of the information transmission spread code generator $38_{\#1}$. The resulted logical multiplication data is output to the phase correcting circuit 78.

The phase correcting circuit 78 corrects the shift of phase based on the absolute phase detecting circuit 77, and the resulted logical multiplication data after the shift of phase has been corrected is output to the data demodulating apparatus 39. The data demodulating apparatus 39 demodulates the data by the output from the absolute phase detecting circuit 77 utilizing an information about the coordinate transformation. The demodulated data is output to the upper application layer 41.

According to this embodiment, the cross talk can be prevented even in a case when an frequency error may happen.

In the above examples of the embodiment, the specification of the basic system will be described as below.

| | |
|---|---|
| Access method/full duplex | SS-CDMA/TDD |
| Downlink | Packet CDMA method |
| Uplink | approximate synchronized CDMA |
| Cell radius | about 150 m |
| Frequency band | 2.45 GHz ISM band |
| Band | 26 MHz (by RCR-STD 33) |
| Target channel numbers/ Transmission speed | 24 channel/64 kbps (per one cell) |

According to the first to the eighth aspects of the invention, the communication circuit without wire can be established between the base stations. Because of this, the flexibility of arrangement for base station location is improved and it causes to realize a construction of communication network with inexpensive cost.

According to the ninth to the eleventh aspects of the invention, a transmission speed can be improved.

According to the twelfth aspect of the invention, the approximate synchronized CDMA can be composed of the matched filter with short code and the sliding correlater, it is possible to realize lower energy consumption.

According to the thirteenth aspect of the invention, an efficiency of transmission can be improved.

According to the fourteenth aspect of the invention, because the efficiency of demodulation is improved, the Eb/NO can be reduced, which is required for the transmission.

According to the fifteenth and sixteenth aspects of the invention, because the transmission timing of uplink can be controlled by that the timing control information for the uplink is inserted into the downlink, the shortening of an interval for the approximate synchronization of the approximate synchronized CDMA can be intended and the improvement of the transmission speed and the increase of channel number can be expected.

What is claimed is:

1. A communication method over a cellular wireless communication network system, comprising:

connecting a plurality of base stations, with wireless communication; and connecting at least one of the plurality of base stations and at least one of a plurality of mobile stations by a packet CDMA communication method, such that a packet of the packet CDMA communication method includes a frame composed of a preamble block having a barker code, an information block having an orthogonal M series codes, and information about a phase, wherein an absolute phase and reverse spreading are determined from the information about the phase included in the preamble block, and detected absolute phase and reverse spreading are subjected to a phase correction and a frequency offset correction, then resultant data is demodulated by an absolute synchronizing detection.

2. The communication method as claimed in claim 1, wherein said wireless communication among the plurality of base stations is achieved by a Spread Spectrum CDMA (SS-CDMA) communication method.

3. The communication method as claimed in claim 1, wherein an uplink communication between the at least one of the plurality of mobile stations and the at least one of the plurality of base stations, is achieved utilizing the Approximate Synchronized CDMA (AS-CDMA) method, such that a packet of the AS-CDMA method includes a flame having a synchronizing block and an information block, said information block includes the AS-CDMA code.

4. The communication method as claimed in claim 1, wherein downlink communication between the at least one of the plurality of base stations and the at least one of the plurality of mobile stations, is achieved by information about the phase included in the preamble block, such that information about the cellular wireless communication network system is determined from the information about the phase.

5. The communication method as claimed in claim 1, wherein said base stations detect a correlation of data transmitted through downlink communication and uplink communication and determine a receiving timing of the data, such that a timing that said receiving timing becomes most suitable is calculated, and a most suitable timing is inserted as a timing controlling information in the flame for the downlink communication and send the data.

6. The communication method as claimed in claim 5, wherein said mobile station establishes synchronization of spread code by detecting the spread code included in the preamble block of the frame transmitted through the downlink communication, performs reverse spreading of the spread code, demodulates resultant data through integral networks, extracts a transmission timing control information inserted in the transmitted flame, controls chip timing of the reverse spread code based on the transmission timing controlling information, transmits demodulated data through the uplink communication.

* * * * *